United States Patent [19]

Bannister

[11] 3,915,954

[45] *Oct. 28, 1975

[54] DERIVATIVES OF LINCOMYCIN AND ITS ANALOGS AND PROCESS

[75] Inventor: Brian Bannister, Kalamazoo, Mich.

[73] Assignee: The Upjohn Company, Kalamazoo, Mich.

[ * ] Notice: The portion of the term of this patent subsequent to Feb. 5, 1991, has been disclaimed.

[22] Filed: June 18, 1973

[21] Appl. No.: 370,603

Related U.S. Application Data

[63] Continuation of Ser. No. 198,990, Nov. 15, 1971, Pat. No. 3,790,560, which is a continuation-in-part of Ser. No. 158,075, June 29, 1971, abandoned, and a continuation-in-part of Ser. No. 161,909, July 12, 1971, abandoned, which is a continuation-in-part of Ser. No. 156,100, June 23, 1971, abandoned.

[52] U.S. Cl. .............. 260/210 R; 260/9 R; 424/180
[51] Int. Cl.² ........................................ C07H 15/16
[58] Field of Search ................................ 260/210 R

[56] References Cited

UNITED STATES PATENTS 3,790,560 2/1974 Bannister ........................ 260/210 R Primary Examiner—Johnnie R. Brown
Attorney, Agent, or Firm—Martin B. Barancik; Roman Saliwanchik

[57] ABSTRACT

Alkyl 7-deoxy-7-$RS_n$-α-thiolincosaminides useful as intermediates for preparing antibacterially active 7-deoxy-7-$RS_n$-lincomycins are prepared by heating alkyl N-acyl-6,7-aziridino-6-deamino-7-deoxy-α-thiolincosaminides with an aliphatic, cycloaliphatic, or aromatic acyclic sulfide (mono, di, tri or tetrasulfide) in the presence of glacial acetic acid or other anhydrous lower alkanoic acid, or anhydrous benzoic acid or other arenoic acid of not more than 12 carbon atoms.

65 Claims, No Drawings

DERIVATIVES OF LINCOMYCIN AND ITS ANALOGS AND PROCESS

CROSS REFERENCE TO RELATED APPLICATIONS

This application is a continuation of copending application Ser. No. 198,990, filed Nov. 15, 1971, now U.S. Pat. No. 3,790,560, which is a continuation-in-part of application Ser. No. 158,075, filed June 29, 1971 and now abandoned, and of application Ser. No. 161,909, filed July 12, 1971 and now abandoned, which is a continuation-in-part of application Ser. No. 156,100, filed June 23, 1971 and now abandoned.

BRIEF DESCRIPTION OF THE INVENTION

The invention relates to alkyl 7-deoxy-7-$RS_n$-α-thiolincoseminides of Formula I and acylates thereof and to a process for making the same

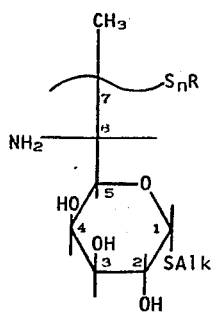

wherein $n$ is 1 to 4, Alk is alkyl of not more than 4 carbon atoms, to wit, methyl, ethyl, propyl, isopropyl, butyl, sec.butyl, isobutyl, and tert.butyl, or 2-hydroxyethyl; R is a radical —$R_1$—$XR_3$ wherein $R_1$ is a saturated aliphatic hydrocarbon radical of not more than 18 carbon atoms, an unsaturated aliphatic hydrocarbon radical of not more than 10 carbon atoms, an aromatic hydrocarbon radical of not more than 11 carbon atoms, or an oxacarbocyclic aromatic or thiacarbocyclic aromatic hydrocarbon radical of not more than 8 carbon atoms; $XR_3$ is hydrogen or 1 or 2 substituents wherein X is oxygen or sulfur and $R_3$ is hydrogen, loweralkyl, loweralkenyl, lowercycloalkenyl, lowercycloalkenyl, loweralkoxyalkyl, loweralkylthioalkyl, phenyl, benzyl, furyl, furfuryl, thienyl, or thenyl; and wherein $R_1$ and $R_3$, when alkyl, can be linked together to form an oxacycloalkyl of not more than 5 carbon atoms, having from 3 to 6 ring members in the ring.

The compounds of Formula I can be obtained by heating in the presence of glacial acetic acid or other anhydrous loweralkanoic acid, or anhydrous benzoic acid or other arenoic acid of not more than 12 carbon atoms, an alkyl N-acyl-6,7-aziridino-6-deamino-7-deoxy-α-thiolincosaminide of the formula:

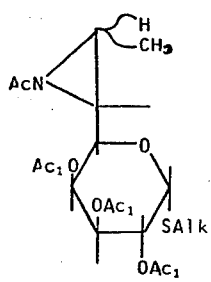

wherein Ac and $Ac_1$ are carboxacyl and Alk is as given above, with sulfide of the formula $R_3X$—$R_1$—$S_n$—R-

$_2$—$YR_4$ wherein $n$ is 1, 2, 3, or 4; $R_1$ and $R_2$ are the same or different and are saturated aliphatic hydrocarbon radicals of not more than 18 carbon atoms, unsaturated aliphatic hydrocarbon radicals of not more than 10 carbon atoms, cycloaliphatic hydrocarbon radicals of not more than 10 carbon atoms, aromatic hydrocarbon radicals of not more than 11 carbon atoms; or oxacarbocyclic aromatic or thiacarbocyclic aromatic hydrocarbon radicals of not more than 8 carbon atoms; $R_3X$ and $YR_4$ are hydrogen or together not more than three substituents wherein X and Y are the same or different and are oxygen or sulfur and $R_3$ and $R_4$ are the same or different and are hydrogen, carboxacyl ($Ac_1$), loweralkyl, loweralkenyl, lowercycloalkyl, lowercycloalkenyl, loweralkoxyalkyl, loweralkylthioalkyl, phenyl, benzyl, furyl, furfuryl, thienyl, or thenyl; and wherein $R_3$ and $R_1$, when X is oxygen and $R_3$ is alkyl, can be linked together to form an oxacycloalkyl of not more than 5 carbon atoms and having from three to 6 members. When it is desired that n be greater than 1 in the final product (Formula I), —$R_2$—$YR_4$ should be a radical that readily forms a carbonium ion, for example, tertiary butyl or allyl. Opening of the aziridine ring is thus effected yielding an acylated alkyl 7-deoxy-7-$RS_n$-α-thiolincosaminide of the following formula:

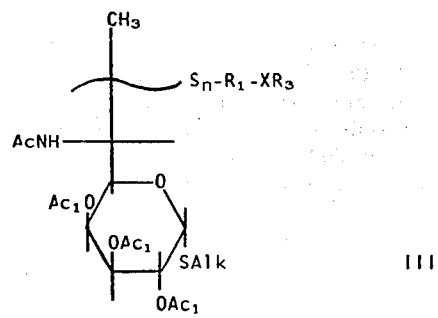

wherein $n$, Ac, $Ac_1$, X, $R_1$, $R_3$, and Alk are as given above.

The acyl groups are then removed by hydrazinolysis in a manner already well known in the art (See U.S. Pat. No. 3,179,565) to yield alkyl 7-deoxy-7-$RS_n$-α-thiolincosaminide of Formula I.

The compounds of the invention (Formula I) are useful for the same purposes as methyl α-thiolincosaminide (methyl 6-amino-6,8-dideoxy-1-thio-D-erythro-α-D-galacto-octopyranoside, α-MTL) as disclosed in U.S. Pat. No. 3,380,992 and as methyl 6-amino-7-chloro-6,7,8-trideoxy-1-thio-L-threo- and D-erythro-α-D-galacto-octopyranosides (U.S. Pat. Nos. 3,496,163 and 3,502,648) and moreover can be acylated with trans-1-methyl-4-propyl-L-2-pyrrolidine carboxylic acid to form carboxylic acids as disclosed in these patents or with an N-(2-hydroxyethyl)-L-2-pyrrolidine carboxylic acid to form compounds of the formula:

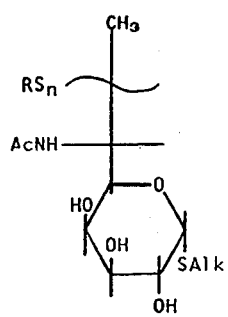

where R, $n$, and Alk are as given and Ac is L-2-pyrrolidinecarboxacyl or an N-methyl, N-ethyl, or N-(2-hydroxyethyl)-L-2-pyrrolidinecarboxyacyl any or all of which can be substituted in the 4-position with loweralkyl or loweralkylidene.

PRIOR ART

It is known that 7-SH analogs can be prepared by heating an aziridino compound of Formula II where Ac and $Ac_1$ are hydrogen with hydrogen sulfide (U.S. Pat. No. 3,544,551). It has not been possible, heretofore, to replace the S-hydrogen, either directly or indirectly. Moreover, the compounds of the invention are substantially more active than the corresponding 7-SH compounds. For example, 7-deoxy-7(S)-(methylthio)-lincomycin hydrochloride is several times more active in vitro against Gram positive bacteria than lincomycin whereas 7-deoxy-7(S)-mercaptolincomycin hydrochloride is less active than lincomycin.

It is also known that 7-OR analogs can be prepared by reacting a compound of Formula II with an alcohol in the presence of an acid. Efforts to produce the sulfur analogs by substituting the alcohol by a mercaptan have been unsuccessful.

DETAILED DESCRIPTION

It has now been found that compounds of Formula II undergo sulfidolysis when heated with a sulfide (mono, di, tri, or tetra) in glacial acetic acid or other anhydrous lower-alkanoic acid or anhydrous benzoic acid or other arenoic acid of not more than 12 carbon atoms. The reaction appears to take the following course:

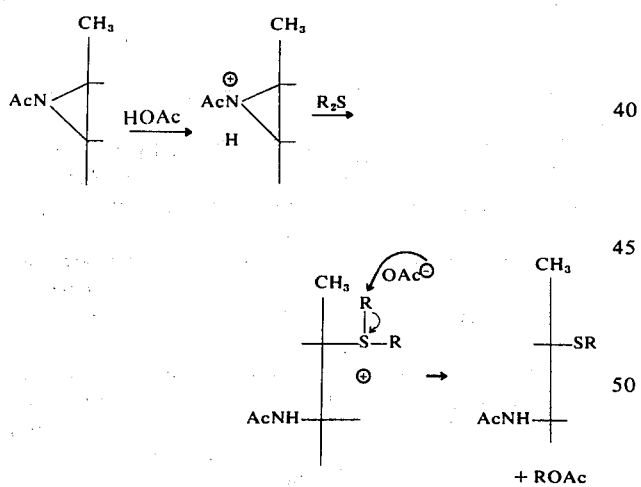

With a mixed sulfide the reaction may be considered as proceeding along these lines

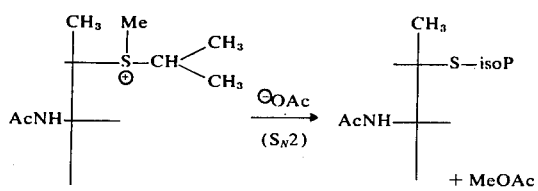

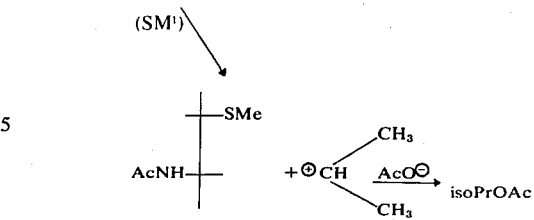

With a polysulfide the reaction follows this course

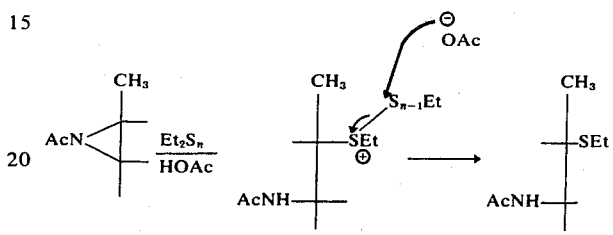

With a mixed polysulfide an additional compound, namely, a disulfide, may be obtained, for example

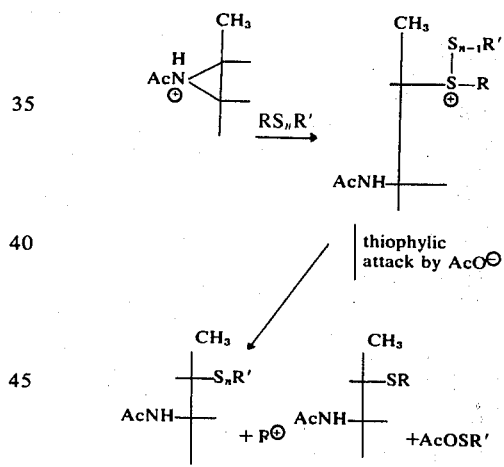

The formation of the polysulfide takes place when R and/or R' is a radical which readily forms a carbonium ion, for example, tert.butyl or allyl. In case of tert.butyl, the carbonium ion could lose a proton to form isobutylene.

With any of the sulfides described above, the desired result is obtained simply by heating an alkyl N-acetyl-6,7-aziridino-6-deamino-7-deoxy-α-thiolincosaminide with the appropriate sulfide in glacial acetic acid or other anhydrous lower alkanoic acid or anhydrous benzoic acid or other arenoic acid of not more than 12 carbon atoms, for example, propionic or butyric acids.

Advantageously, a solvent toiling at about 70° to 110° is used. Ordinarily an excess of sulfide is used for this purpose. Such solvents as dioxane, carbon tetrachloride, benzene, or toluene can be used if desired and advantageously with sulfides boiling above about 110°.

The proportions are not critical to the reaction, but are critical to the yields. Thus optimum yields are obtained with about 3 to 7 equivalents of acid coupled with a substantial excess, at least twofold, of the sulfide. That is another advantage of using the sulfide as a solvent. When a sulfide, such as methyl sulfide, which is so low boiling as to give a reaction mixture that refluxes below 70°, is used, super atmospheric pressure can be used; if it is such that the reaction mixture boils above about 110° controlled heating can be used. Otherwise it is suitable to heat at the reflux temperature.

The reaction mixture can be worked up by procedures already well known in the art such as countercurrent distribution, chromatography, and solvent extraction or crystallization.

The starting compounds of Formula II exist in two epimeric forms as follows:

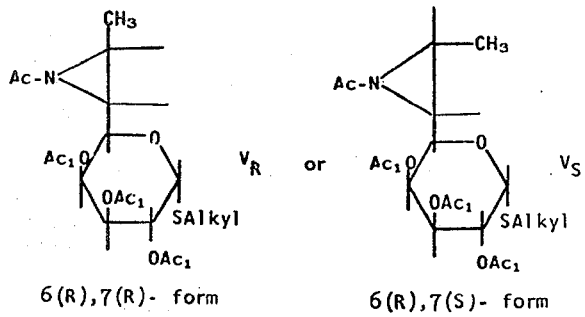

6(R),7(R)- form   6(R),7(S)- form

In the reaction an inversion takes place. For example, when methyl sulfide is reacted with methyl N-acetyl-2,3,4-tri-0-acetyl-6(R),7(R)-aziridino-6-deamino-7-deoxy-α-thiolincosaminide, methyl N-acetyl-2,3,4-tri-0-acetyl-7-deoxy-7(S)(methylthio)-α-thiolincosaminide is obtained.

The starting compounds of Formula II are obtained by acylating a compound of the formula

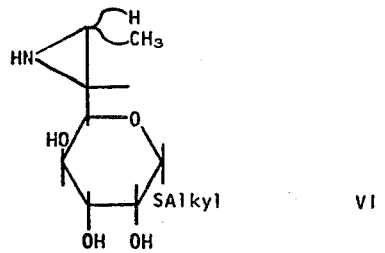

with a carboxacyl acylating agent, such as, acetic anhydride or other lower alkanoic acid anhydride or benzoyl chloride or like carboxacyl halide, in a manner already known in the art. Since the amino and hydroxy groups acylate at different rates the N-acyl, Ac, and the O-acyls, $Ac_1$, can be the same or different.

Inasmuch as these acyl groups (Ac and $Ac_1$) do not appear in the final product but are removed in the processing, it is immaterial what they are as long as they are carboxyacyl. Suitable such carboxacyls are hydrocarboncarboxacyl containing not more than 18 carbon atoms or halo-, nitro-, hydroxy-, amino-, cyano-, thiocyano-, or alkoxysubstituted hydrocarbon carboxacyls of not more than 18 carbon atoms. Advantageously, they are inert carboxacyls, that is to say, carboxacyls that are not effected by the reaction. Most commonly they will be acetyl or other lower alkanoyl, or benzoyl or other aroyl of not more than 12 carbon atoms. Nonetheless, they may be any carboxacyl.

The starting compounds of Formula VI can be prepared by the dehydrohalogenation of compounds of the formula:

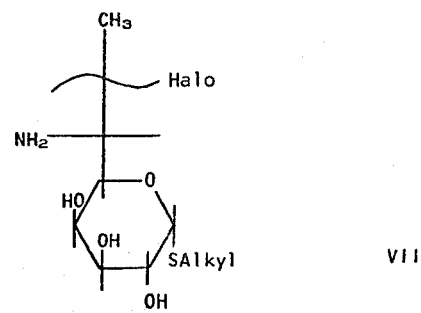

which are known in the art. U.S. Pat. No. 3,502,648. The dehydrohalogenation is effected according to U.S. Pat. No. 3,544,551 by heating a compound of Formula VII in an inert solvent in the presence of an acid acceptor. A suitable process is to heat a reaction mixture of starting compound, anhydrous sodium carbonate, and dimethylformamide at reflux for a short time, remove the solvent, and crystallize from a suitable solvent, for example, methanol. See Belgian Pat. No. 732,352, Oct. 30, 1969.

The starting sulfides of formula $R_3X-R_1-S_n-R_2-YR_4$ are known compounds. R in Formula I is the radical $R_3X-R_1$ as defined above.

Suitable such starting sulfides (mono and poly) include for example, saturated aliphatic hydrocarbon sulfides, alkyl sulfides, which may be symmetrical or unsymmetrical, where alkyl is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl and the isomeric forms thereof, for example, methyl sulfide, ethylmethyl sulfide, ethyl sulfide, butyl sulfide, 2-butyl sulfide, tert.butyl sulfide, methyl propyl sulfide, isopropyl methyl sulfide, ethyl propyl sulfide, ethyl isopropyl sulfide, butylmethyl sulfide, 2-butylmethyl sulfide, isobutyl methyl sulfide, tert.butyl methyl sulfide; methyl pentyl sulfide, isopropyl propyl sulfide, 1-ethylpropyl methyl sulfide, ethyl isobutyl sulfide, tert.butyl ethyl sulfide, sec.butyl ethyl sulfide, butyl ethyl sulfide, propyl sulfide, isopropyl sulfide, hexil methyl sulfide, ethyl pentyl sulfide, isobutyl propyl sulfide, sec.butyl propyl sulfide, butyl propyl sulfide, isobutyl isopropyl sulfide, sec.butyl isopropyl sulfide, tert.butyl isopropyl sulfide, butyl isopropyl sulfide, pentyl propyl sulfide, heptyl methyl sulfide, ethyl 1methylpentyl sulfide, ethyl hexyl sulfide, ethyl 1-ethylbutyl sulfide, ethyl 1,3-dimethylbutyl sulfide, butyl isobutyl sulfide, butyl sec. butyl sulfide, isobutyl sulfide, methyl octyl sulfide, hexyl propyl sulfide, butyl pentyl sulfide, butyl isopentyl sulfide, isopentyl sulfide, pentyl sulfide, isopropyl octyl sulfide, isopropyl 1-methylheptyl sulfide, decyl methyl sulfide, nonyl propyl sulfide, butyl 1-propylpentyl sulfide, butyl octyl sulfide, butyl 1-methylheptyl sulfide, bis(1,3-dimethylbutyl)-sulfide, isohexyl sulfide, hexyl sulfide, dodecyl methyl sulfide, propyl undecyl sulfide, nonyl pentyl sulfide, hexyl octyl sulfide, hexyl 1-methylheptyl sulfide, dodecyl ethyl sulfide, butyl decyl sulfide, bis (5-methylhexyl)sulfide, bis(1,4-dimethylpentyl)-sulfide, heptyl sulfide, methyl tetradecyl sulfide, 2-ethylhexyl 1-methylheptyl sulfide, bis(isopropylpentyl)sulfide. bis(2-ethylhexyl)sulfide, octyl sulfide, hexadecyl methyl sulfide, nonyl sulfide, tert.butyl 1-ethyl-1-methylbutyl sulfide, butyl heptyl sulfide, decyl methyl sulfide, ethyl nonyl sulfide, octyl propyl sulfide, hexyl pentyl sulfide, decyl sulfide, decyl disulfide, butyl hexadecyl sulfide, dodecyl octyl sulfide, ethyl octadecyl sulfide, heptadecyl propyl sulfide, dodecyl sulfide, tert.dodecyl sulfide, tert.dodecyl disulfide, tert.dodecyl trisulfide, tetradecyl disulfide, tetradecyl tetrasulfide, dodecyl octadecyl sulfide, hexadecyl sulfide, hexadecyl disulfide, hexadecyl trisulfide, hexadecyl tetrasulfide, tert.hexadecyl tetrasulfide, bis(1,1-dipentylhexyl)disulfide, octadecyl disulfide, octadecyl trisulfide, and octadecyl tetrasulfide; unsaturated aliphatic hydrocarbon sulfides, for example, vinyl sulfide, vinyl disulfide, methyl vinyl sulfide, ethyl vinyl sulfide, propyl vinyl sulfide, isopropyl vinyl sulfide, butyl vinyl sulfide, allyl sulfide, allyl disulfide, allyl methyl sulfide, allyl methyl disulfide, allyl ethyl sulfide, allyl ethyl disulfide, allyl propyl sulfide, allyl propyl disulfide, propenyl sulfide, allyl 2-methylallyl sulfide, methyl propenyl sulfide, bis(2-methylallyl)sulfide, ethyl propenyl sulfide, ethyl isopropenyl sulfide, propenyl propyl sulfide, propenyl propyl disulfide, methyl 1-methylallyl sulfide, ethyl methallyl sulfide, 2-butenyl methyl sulfide, -butenyl ethyl sulfide, 2-butenyl ethyl sulfide, methyl 1-methyl-2-butenyl sulfide, methyl 2-methyl-2-butenyl sulfide, methyl 3-methyl-3-butenyl sulfide, methyl 2-pentenyl-1-butenyl sulfide, methyl 3-pentenyl-1 butenyl sulfide, methyl 1-methyleneallyl sulfide, ethyl 1-methyleneallyl sulfide, 1,3-butadienyl methyl sulfide, 1,2-butadienyl ethyl sulfide, 2,3-butadienyl ethyl sulfide, ethynyl methyl sulfide, ethyl ethynyl sulfide, ethynyl isopropyl sulfide, butyl ethynyl sulfide, tert.butyl ethynyl sulfide, ethyl 1-propynyl sulfide, ethyl 2-propynyl sulfide, 1-propynyl vinyl sulfide, isopropyl propynyl sulfide, methyl 1-propynyl sulfide, 1-butynyl methyl sulfide, 3-butynyl methyl sulfide, 1-butynyl ethyl sulfide, 3-butynyl ethyl sulfide, 1-buten-3-ynyl methyl sylfide, 1-buten-3-ynyl butyl sulfide, 3-buten-1-ynyl methyl sulfide; 3-buten-1-ynyl ethyl sulfide, 1-propynyl sulfide, 1-butynyl sulfide, 1-hexynyl vinyl sulfide, and ethyl 1-heptynyl sulfide; cycloaliphatic hydrocarbon sulfides, for example cyclopentyl methyl sulfide, cyclopentyl ethyl sulfide, cyclopentyl propyl sulfide, cyclopentyl isopropyl sulfide, cyclopentyl butyl sulfide, cyclopentyl isobutyl sulfide, cyclopentyl sec.butyl sulfide, cyclopentyl tert.butyl sulfide, cyclopentyl pentyl sulfide, cyclopentyl sulfide, cyclopentyl disulfide, cyclohexyl methyl sulfide, cyclohexyl ethyl sulfide, cyclohexyl vinyl sulfide, cyclohexyl butyl sulfide, cyclohexyl sec.-butyl sulfide, cyclohexyl pentyl sulfide, cyclohexyl cyclopentyl sulfide, cyclohexyl sulfide, cyclohexyl disulfide, bis(cyclohexylmethyl)sulfide, 5-(ethylthio)-2-norbornene, 5-(butylthio)-2-norbornene, bis(4-methylcyclohexyl)sulfide, 3-methyl-1-(4-methylcyclohexylthio)butane, 1-cyclohexen-1-yl octyl sulfide, 3-cyclohexen-1-yl 3-vinylcyclohexyl sulfide, 3-cyclohexen-1-yl 4-vinylcyclohexyl sulfide, 1-cyclohexen-1-yl vinyl sulfide, and 2,4,6-cycloheptatrien-1-yl sulfide; aromatic sulfides, for example, methyl phenyl sulfide, ethyl phenyl sulfide, propyl phenyl sulfide, isopropyl phenyl sulfide, butyl phenyl sulfide, sec.-butyl phenyl sulfide, isobutyl phenyl sulfide, tert.butyl phenyl sulfide, pentyl phenyl sulfide, isopentyl phenyl sulfide, hexyl phenyl sulfide, isohexyl phenyl sulfide, iso.sec.hexyl phenyl sulfide, 1-ethyl-1-methylpropyl phenyl sulfide, 1,1-dimethylbutyl phenyl sulfide, 1,5-hexadienyl phenyl sulfide, 1-ethyl-1-butenyl phenyl sulfide, 1-tert.butylvinyl phenyl sulfide, phenyl 1-vinyl-3-butenyl sulfide, cyclohexyl phenyl sulfide, cyclohexyl phenyl disulfide, 1-cyclohexen-1-yl phenyl sulfide, 2-cyclohexen-1-yl phenyl sulfide, 3-cyclohexen-1-yl phenyl sulfide, 1-methylcyclohexyl phenyl sulfide, octyl phenyl sulfide, 1-ethyl-1-methylpentyl phenyl sulfide, 1-methylheptyl phenyl sulfide, phenyl 1,1,4-trimethyl-3-pentenyl sulfide, 3,4-dimethyl-3-cyclohexen-1-yl phenyl sulfide, 3(cycloocten-1-yl)phenyl sulfide, 2-(cycloocten-1-yl)phenyl sulfide, 4-(cycloocten-1-yl)-phenyl sulfide, 2-(3-cyclohexen-1-yl)ethyl phenyl sulfide, pentyl p-tolyl sulfide, hexyl o-tolyl sulfide, 1-ethyl-1-butenyl p-tolyl sulfide, m-tolyl sulfide, o-tolyl sulfide, p-tolyl sulfide, m-tolyl disulfide, o-tolyl disulfide, p-tolyl disulfide, o-tolyl p-tolyl sulfide, butyl 3,4xylyl sulfide, phenyl 3,4-xylyl sulfide, propyl o-propylphenyl sulfide, o-cymen-3-yl isopropyl sulfide, p-tert.butylphenyl isopropyl sulfide, isopropyl thymyl sulfide, tert.butyl p-tert.butylphenyl sulfide, sec.butyl o-sec.butylphenyl sulfide, tert.butyl o-(2-methylallyl)phenyl sulfide, 4-tert.butyl-o-tolyl methyl sulfide, 2-cyclopenten-1-yl p-tolyl sulfide, 2,4,6-cycloheptatrien-1-yl p-tolyl sulfide, 2-cyclopropylphenyl sulfide, p-(2,4,6-cycloheptatrien-1Yl)-phenyl methyl sulfide, butyl 1-naphthyl sulfide, butyl 2-naphthyl sulfide, 1-methyl-2-(methylthio)acenaphthalene, 2(methylthiofluorine, benzyl pentyl sulfide, benzyl hexyl sulfide, benzyl 1-ethyl-2-methylpropyl sulfide, benzyl 1,1-dimethylbutyl sulfide, benzyl 1,3-dimethyl-2-butenyl sulfide, benzyl 2,4,6-cycloheptetrien-1-yl sulfide, benzyl cyclohexyl sulfide, methyl 5-phenylpentyl sulfide, benzyl 1,1-dimethyl-2-propynyl sulfide, p-methylbenzyl phenyl sulfide, o-methylbenzyl phenyl sulfide, phenethyl phenyl sulfide, benzyl p-tolyl tetrasulfide, benzyl p-tolyl disulfide, benzyl m-tolyl sulfide, benzyl p-tolyl sulfide, benzyl disulfide, tert.butyl styryl sulfide, butyl styryl sulfide, butyl 1-phenylvinyl sulfide, phenyl styryl sulfide, phenyl 1-phenylvinyl sulfide, ethyl 1-isopropyl-3-phenylpropadienyl sulfide, ethyl 1-methyl-3-phenylpropadienyl sulfide, tert.butyl phenylethynyl sulfide, isobutyl phenylethynyl sulfide, 2-(methylthio)-furan, 3-(methylthio)-furan, 2-(ethylthio)-furan, 2-[(methylthio)methyl]-furan, 2[(ethylthio)methyl]-furan, 2-ethylthio-5-methyl-furan, 2-ethyl-4-(ethylthio)-furan, 2-ethyl-5(ethylthio)-furan, 2-(butylthio)-5-methyl-furan, 2[(isopropylthio)methyl]-furan, 1[(propylthio)-methyl]-furan, 2[(butylthio)methyl]-furan, 2[(tert.butylthio)methyl]-furan, 2[(isobutylthio)methyl]-furan, 2(butylthio)-5-methyl-furan, 2(isobutylthio)-5-methyl-furan, 2[(isopentylthio)methyl]-furan, 2[(pentylthio)methyl]-furan, 2[(hexylthio)methyl]-furan, 2[(octylthio)methyl]-furan, 2[(allylthio)-methyl]-furan, 2-](methylthio)thiophene, 3-methylthio)-thiophene, 2-ethylthiophene, 3-ethylthiophene, 2-(propylthio)-thiophene, 2-(isopropylthio)-thiophene, 2(butylthio)-thiophene, 2(sec.butylthio)-thiophene, 2(tert.butylthio)-thiopehen, 3(butylthio)-thiophene, 3(butyldithio)-thiophene, 2(pentylthio)-thiophene, 2(isopentylthio)-thiophene, 2(nonylthio)- thiophene, 2-decylthio)-thiophene, 3(decylthio)-thiophene, 2-(undecylthio)-thiophene, 2(dodecylthio)-thiophene, 2(tetradecylthio)-thiophene, 2(vinylthiomethyl)-thiophene, 2-(cyclopentylthio)-thiophene, 2-(phenyldithio)-thiophene, 2-methyl-5-(methyl-thio)-thiophene, 3-methyl-2-(methylthio)-thiophene, 2-(ethylthio)-5-methyl-thiophene, 3-(ethylthio)-2,5-dimethyl-thiophene, 2-(butylthio)-5-methyl-thiophene, 2-(tert.butylthio)-5-methyl-thiophene, 2-(benzylthio)-5-methyl-thiophene, 2-(benzylthio)-5-ethyl-thiophene, 2-[(ethylthio)methyl]-thiophene, 2-[(butylthio)methyl]-thiophene, 2-[isobutylthio)methyl]-thiophene, 2-[(butylthio)methyl]-5-methyl-thiophene, 2-[(isobutylthio)methyl)methyl]-5-methyl-thiophene, 2-[(3-hexyl)-thio]-propyl-thiophene, 2-[p-methyl-α-(p-tolylthio)benzyl]-furan, 2-[p-methyl-α-(p-tolylthio)benzyl]-furan, 2-[[2-(butylthio)ethoxy]methyl]-furan, 2,5-bis(phenylthio)-3,4-bis(p-tolylthio)-thiophene, and like compounds were one or both $R^1$ and $R^2$ groups are substituted as above, for example, 3-(methylthio)-1-propanol, 1(methylthio)-2-propanol, 2-(ethylthio)-ethanol, 3-(ethylthio)-1-propanol, 1-(ethylthio)-2-propanol, 2(isopropylthio)-ethanol, 4-(methylthio)-1-butanol, 4(methylthio)-2-butanol, 3-(isopropylthio)-ethanol, 2-(butylthio)-ethanol, 2-(tert.butylthio)-ethanol, 3(methylthio)-1-hexanol, 3-(tert.butylthio)'b-propanol, 2-(hexylthio)-ethanol, 8-(methylthio)-1-octanol, 9-(methylthio)-1-nonanol, 2-(octylthio)-ethanol, 2-(ethylhexylthio)-ethanol, 1(octylthio)-2-butanol, 2-methyl-1-(octylthio)-2-propanol, 3-methyl-1-(octylthio)-2-butanol, 3-(methylthio)-1,2-propanediol, 2,2'-dithiodiethanol, 1-[(2-hydroxyethyl)-thio]-2-propanol, 2[-(2-methoxyethyl)thio]-ethanol, 2-[2-(ethylhexyloxy)ethylthio]ethanol, 2-[1-methylheptyl)-thio]-2-propanol, 1(octylthio)-2-propanol, 2-(decylthio)-ethanol, 5-(heptylthio)-1-pentanol, 2(methylthio)-ethanethiol, 2-(ethylthio)-ethanethiol, 2-(2-mercaptoethylthio)-ethanol, 1-(2-mercaptoethylthio)-2-propanethiol, 1-(ethylthio)-2-propanethiol, 2-(isopropyl)thio)-ethanethiol, 3-(octylthio)-1-propanethiol, (methylthio)-acetaldehyde, dimethyl mercaptal, methyl 2-(methylthio)-ethyl ether, ethel 2-(methylthio)-ethyl ether, 1-(methoxymethoxy)-2-(methylthio)-ethane, bis(2-methoxyethyl)sulfide, bis(2-methoxypropyl)sulfide, bis(isopropoxymethyl)sulfide, butyl 2-ethoxyethyl sulfide, 2-butoxyethyl ethyl sulfide, 2-butoxyethylbutyl sulfide, bis[2-(decenyloxy)ethyl]sulfide, 1,2-bis(methylthio)-ethane, 1,2-bis(methylthio)-propane, 1-(ethylthio)-2-(methylthio)-ethane, 1,2-bis(methylthio)-propane, 1,3-bis(methylthio)-propane, 1,2-bis(ethylthio)-propane, 1,2-bis(butylthio)-propane, 1,3-bis(butylthio)-propane, 1,3-bis(tert.butylthio)-propane, 1,10-bis(methylthio)-decane, 1,4-bis(butylthio)-butane, 1,6-bis(butylthio)-hexane, 1,2-bis(butylthio)-3,3-dimethylbutane, 1,2-bis(hexylthio)-ethane, 1,3-bis(butylthio)-2,2-bis[(butylthio)methyl]-propane, 1,5-bis(decylthio)-pentane, 1,4-bis(decylthio)-butane, 1,2-bis(decylthio)-ethane, 1,5-bis(dodecylthio)-pentane, 1,4-bis(dodecylthio)-butane, 1,3-bis(dodecylthio)-propane, 1,2-bis(-dodecylthio)-ethane, 1,5-bis(tetradecylthio)-pentane, 1,4-bis(tetradecylthio)-butane, 1,3-bis(tetradecyl)thio)-propane, 1,2-bis(tetradecylthio)-ethane, bis(hexadecylthio)-methane, 1,2-bis(hexadecylthio)-ethane, 1,3-bis-(hexadecylthio)-propane, 1,4-bis(hexadecylthio)-butane, 1,5-bis(hexadecylthio)-pentane, 1,2-bis(octadecylthio)-ethane, 1-(hexadecylthio)-4-(octadecylthio)-butane, 1-(hexadecylthio)-5-(octadecylthio)-pentane, 1-(octadecylthio)-6-(pentadecylthio)-hexane, 2,3-bis(methylthio)-propyl methyl ether, 2,3-bis(ethylthio)-1-propanol, 3,4-bis(ethylthio)-2-methyl-2-butanol, 2-(2-ethoxydethyldithio)-ethanethiol, 1-(allylthio)-2-propanethio, 3-(allylthio)-1-propanethio, 2-(1-propynylthio)-ethanol, 2,-(2-propynylthio)-ethanol, 4-(methylthio)-2-buten-1-ol, 4-(methylthio)-2-buten-2-ol, 4-(ethylthio)-4-buten-1-ol, 1-(ethylthio)-3-buten-1-ol, 2-methyl-1-(methylthio)-3-buten-1-ol, 1-(vinylthio)-2-propanol, 1,2-bis(methylthio)-ethylene, 1,2-bis(ethylthio)-ethylene, bis(ethylthio)-acetylene, 2-(cyclohexylthio)-ethanol, 3-(cyclohexylthio)-1-propanol, β-(ethylthio)-$\Delta_1$, β-cyclopentaneethanol, β-(ethylthio)-$\Delta_1$, β-cyclohexane-ethanol β-(ethylthio-2-cyclohexylethanol, Δ-(ethylthio)-3-cyclohexyl-1-propanol, 3[(4-tert.butylcyclohexyl)thio]-1-propanol, 2-(methylthio)-cyclopentanol, 2-(ethylthio)-cyclopentanol, 1-[ 2(ethylthio)vinyl]-cyclohexanol, 2-(butylthio)-cyclohexanol, 2-(ethylthio)-ethynylcyclohexanol, 2-[4-tert.butylcyclohexyl)thio]-ethyl ethyl ether, cyclohexyl 4-(ethylthio)-1,3-butadienyl ether, 1,6-bis(cyclopentylthio)-hexane, 1,2-bis(ethylthio)-cyclohexane, 1-(ethylthio)-3-methylnonyn-3-ol, 2-hexylthio)-ethynyl vinyl sulfide, 1-butenyl 2-(butylthio)-ethyl sulfide, butyl 4-(ethylthio)-1,3-butadienyl sulfide, bis[4-(methylthio)butyl]ether, bis[2-(butylthio)ethyl]ether, 2-(butylthio)-ethyl vinyl ether, 2-(butylthio)-vinyl ethyl ether, 2-(tert.butylthio)-vinyl ethyl ether, butyl 2-(vinylthio)-ethyl ether, sec.butyl 2-(vinylthio)-ethyl ether, 2-(allylthio)-ethyl vinyl ether, 2-(methylthio)-tetrahydropyran, 3-(methylthio)-3-oxetanemethanol, 2-(ethylthio)-ethanol acetate, 4-(methylthio)-1-butanol benzoate, 3-(methylthiio)-2-propen-1-ol acetate, 2-(vinylthio)-2-propanol acetate, and 1,2,4-tris-(ethylsulfide)-benzene, 1,3,5-tris(ethylsulfide)-benzene, 2(butylthio)-1-(p-tolylthio)-propane, 1,2bis(butylthio)-benzene, 1(methylthio)-2-(phenylthio)-propane, 2-(methylthio)-1-(phenylthio)-propane, 1,2-bis(phenylthio)-ethylene, 1,2-bis(phenylthio)-ethane, 1-(benzylthio)-2-(methylthio)benzene, p-(methylthio)-α-(phenylthio)-toluene, 2-[)p-(1-methylpentyl)phenyl]thio]-ethanol, 2-[(p-sec.butylphenyl)thio]-ethanol, 2-[(p-tert.butylphenyl)thio]-ethanol, 3-[(p-tert.butylphenyl)thio]-1-propanol, 2-[(3-tert.butylβ-5-methylsalicyl)thio]-ethanol, 5-(bentylthio)-1-pentanol, o-(benzylthio)-benzyl alcohol, p-(benzylthio)-benzyl alcohol, 5-(p-tolylthio)-1-pentanol, 1-(phenylthio)-2-hexanol, 2,3-dimethyl-1(phenylthio)-3-buten-2-ol, 2-methyl-5-(phenylthio)-2-pentenol, 2-methyl-7 (phenylthio)-3,5-heptadiyn-2-ol, 2-[(1,2,3,4-tetrajydro-2-naphthyl)thio]-ethanol, 3-(phenylthio)-2-norbornene methanol, 2-methylene-5-(phenylthio)-2-norbornane, 2-methylene-6-(phenlylthio)-'bnorbornane, β-(phenylthio)-phenethyl alcohol, m-(hexylthio)-phenol, o-(hexylthio)-phenol, o-(heptylthio)-phenol, m-(octylthio)-phenol, phenylthio)-phenethyl alcohol, m-(hexylthio)-phenol, o-(hexylt o-(octulthio)-phenol, p-(octylthio)-phenol, 6-(ethylthio)thymol, 2,6-diisopropul-4-(methylthio)-phenol, 2,3,5,6-tetramethyl-4-[(methylthio)methyl]-phenol, 3-methoxy 4-(phenylthio)-o-cresol, 3-(ethylthio)-4-(hexylthio)-phenol, 1-(butylthio)-2-naphthol, p-[(phenylthio)methyl]-anisole, p-(o- tolylthio)-anisole, p-(p-tolylthio)-anisole, p-(p-tolyldithio)-anisole, p-[(2,2-dimethylpropyl)thio]-anisole, 3-butylthio)-phenetole, 1,2-dimethoxy-4-(phenylthio)-benzene, 2,4-dimethoxy-1(phenylthio)-benzene, benzyloxy-(phenylthio)-methane, 2-[(2-methoxyethyl)thio]-1,2,3,4-tetrahydronaphthylene, benzyl p-(methylthio)phenyl ether, β-(ethylthio)-2-isopropyl-4-methyl-phenetole, 3-methyl-4(propylthio)-benzyl propyl ether, phenyl 2-(phenylthio)-vinyl ether, 2(benzylthio)-tetrahydropyran, 3-[(m-tolylthio)methyl]-3-oxetanemethanol, 3-[(o-tolylthio)methyl]-3-oxetanemethanol, 3-[(p-tolylthio)methyl]-3-oxetanemethanol, 1(epoxyethyl)-4-(phenylthio)-benzene, 2,5-bis(ethylthio)-furan, 2-[1-[2-(butylthio)-ethoxy]propyl]-furan, 2-[1-[2-(butylthio)ethoxy]butyl]-furan, 2-[1-[2-(butylthio)-ethoxy]butyl]-furan, 2-[1-[2-(butylthio)ethoxy]pentyl]-furan, 2,3-bis(ethylthio)methyl]-thiophene, 3,4-bis[(ethylthio)methyl]-thiophene, 2,5-bis[(propylthio)methyl]-furan, 2-[[2-(butylthio)ethoxy]methyl]-furan, 2,5-bis(butylthio)-thiophene, 2,5-bis(tert.-butylthio)-thiophene, 2(tert.butylthio)-5-(hexylthio)-thiophene, 2-(tert.butylthio)-5-(isopentylthio)-thiophene, 3,4-bis(cyclohexylthio)-thiophene, 2,5-bis(phenylthio)-thiophene, 2,5-bis(1-naphthylthio)-thiophene, 2-(methylthio)-3-thiophenethiol, 5-(methylthio)-2-thiophenethiol, 3(methyl-thio)-4-thiophenethiol, 3-(methylthio)-5-thiophenethiol, 5-heptylthio-2-thiophenemethanol, 2-tert.butoxy-5-methylthio-thiophene, 2-(tert.butylthio)-5-(hexylthio)-thiopene, 2-(diethoxymethyl)-5-ethyl-3-(ethylthio)-thiophene, 3-(diethoxymethyl)-5-ethyl-2-(ethylthio)-thiophene, 2-(benzylthio)-3 -(diethoxymethyl)-5-ethyl-thiophene, 2,5-bis(2-thienylthio)-thiophene, 2,5-bis(3-thienylthio)-thiophene, 3,4-bis(2-thienylthio)-thiophene, 3,4-bis(3-thienylthio)-thiophene, 3,4-bis(cyclohexylthio)-2,5-bis(ethylthio)-thiophene.

Any of the above sulfides that contain one or more hyroxy or sulfhydryl groups can be esterified. Usually these esters will be the acetate or the benzoate but for reasons given above in respect to the Ac and Ac₁ groups, they can be any carboxacyl. In other words any of the hydrogens of these hydroxy or sulfhydryl groups can be replaced by an Ac₁ group which may be the same or different from the Ac₁ groups in the 2-, 3-, 4-0-positions.

By acylating the compounds of the invention (Formula 1) with an L-2-pyrrolidinecarboxylic acid, compounds of Formula IV in which Ac is the acyl of the L-2-pyrrolidinecarboxylic acid are obtained. When Alk and R are methyl and the L-2-pyrrolidinecarboxylic acid is trans-1-methyl-4-propyl-L-2-pyrrolidinecarboxylic acid and the configuration is (S), the compound is 7-deoxy-7(S)-(methylthio)-lincomycin which has antibacterial activity several times that of lincomycin. It and its analogs can be utilized for the same purposes and in the same way as lincomycin.

The compounds of the invention (Formula 1) as well as the acylates thereof with an L-2-pyrrolidinecarboxylic acid can exist in either the free base form or in the form of an acid addition salt. Unless otherwise specified or otherwise dictated by the context both the acid addition form and the free base form are intended. These acid addition salts can be made by neutralizing the free base with the appropriate acid to below about pH 7.0, and advantageously to about pH 2 to pH 6. Suitable acids for this purpose include hydrochloric, sulfuric phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, dimethyldithiocarbmic, hexadecylsulfamic, octadecylsulfamic, sorbic, monochloroacetic, undecylenic, 4'-hydroxyazobenzene-4- sulfonic, octyldecylsulfuric, picric, benzoic, cinnamic, and like acids.

The acid addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thusextracted acid solution or converted to another salt by methathesis.

The free bases can be used as buffers or as antacids. They react with isocyanates to form urethanes and can be used to modify polyurethane resins. The thiocyanic acid addition salt when condensed with formaldehyde forms resinous materials useful as pickling inhibitors according to U.S. Pat. Nos. 2,425,320 and 2,606,155. The free bases also make good vehicles for toxic acids. For example, the fluosilicic acid addition salts are useful as mothproofing agents accordinf to U.S. Pat. Nos. 1,915,334 and 2,075,359 and the hexafluoroarsenic acid and hexafluorophosphoric acid addition salts are useful as parasiticides according to U.S. Pat. Nos. 3,122,536 and 3,122,552.

The invention may now be more fully understood by reference to the following examples in which the parts are by weight except where solvent ratios are given or except as otherwise specified and the c.g.s. system is used unless otherwise specified.

EXAMPLE 1

7-Deoxy-7(S)-(methylthio)-lincomycin Hydrochloride

Part A-1: Methyl N-acetyl-2,3,4-tri-0-acetyl-7-deoxy-7(S)-(methylthio)-α-thiolincosaminide

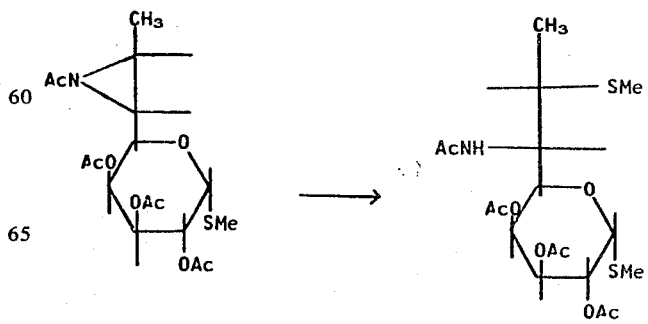

A mixture of 5.0 gms. (1 mcl. equiv.) methyl N-acetyl-2,3,4-tri-0-acetyl-6(R),7(R)-aziridino-6-deamino-7-deoxy-α-thiolincosaminide, 50 ccs. methyl sulfide, and 5.25 gms. (7 mol. equivs.) glacial acetic acid is heated in a Pyrex sealed tube for 20 hours in a steam-bath. Volatile materials are removed from the slightly pink reaction solution by distillation at 100° C., the residue is dissolved in methylene chloride and stirred with an excess of saturated aqueous sodium bicarbonate. Washing of the organic layer with water, drying over anhydrous sodium sulfate, and removal of the solvent on a rotating evaporator at 40°/7 mm. gives a slightly pink solid (5.92 gms.), showing no starting material by TLC ($SiO_2$ gel, 1 acetone:1 Skellysolve B) and a major new zone of slightly lower Rf. TLC refers to thin layer chromatography and Skellysolve B is technical hexane.

Countercurrent distribution of this solid in the system 1 ethanol;1water;1 ethyl acetate:2 cyclohexane gives methyl N-acetyl-2,3,4-tri-0-acetyl-7-deoxy-7(S)-(methylthio)-α-thiolincosaminide at a K value of 1.21, as colorless rods from ethyl acetate-Skellysolve B having the following characteristics:

m.p. 225°–226° C.

$[\alpha]_D$ +225° (c, 0.9876, $CHCl_3$)

Analysis:

Calcd. for $C_{18}H_{29}O_8NS_2$:

C, 47.88; H, 6.47; N, 3.10; S, 14.20; M. Wt. 451.55.

Found: C, 47.87; H, 6.49; N, 3.19; S, 14.31; M. Wt. (Mass spec., M⁺) 451.

Part B-1: Methyl 7-deoxy-7(S)-methylthio-α-thiolincosaminide

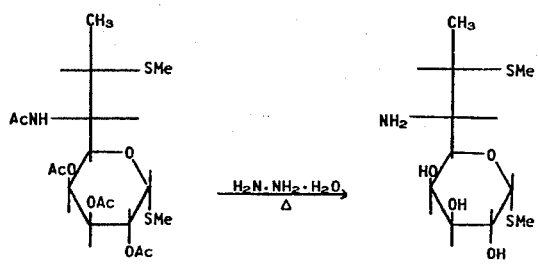

A mixture of 8.05 gms. methyl N-acetyl-2,3,4-tri-0-acetyl-7-deoxy-7(S)-methylthio-α-thiolincosaminide (Part A-1) and 100 ccs. hydrazine hydrate is stirred magnetically and heated under gentle reflux in an oil bath at 160° C. for 22 hrs. Removal of the volatile material from the colorless solution by distillation from the oil bath at 110° C./7 mm. gives methyl 7-deoxy-7(S)-methylthio-α-thiolincosamide (B-1) as a colorless solid which crystallizes from methanol in colorless needles having the following characteristics:

m.p. 174°–175° C. $[\alpha]_D$ +260° (c, 0.6790, $H_2O$)

Analysis:

Calcd. for $C_{10}H_{21}O_4NS_2$:

C, 42.38; H, 7.47; N, 4.94; S, 22.63;

M. Wt. 283.41.

Found: C, 42.39; H, 7.52; N, 4.65; S, 22.78; M. Wt. (Mass spec., M⁺) 283.

Part C-1: 7-Deoxy-7(S)-(methylthio)-lincomycin hydrochloride [Methyl 6,7,8-trideoxy-7-(methylthio)-6-trans-(1-methyl-4-propyl-L-2-pyrrolidinecarboxamido)-1-thio-L-threo-α-D-galacto-octopyranoside hydrochloride]

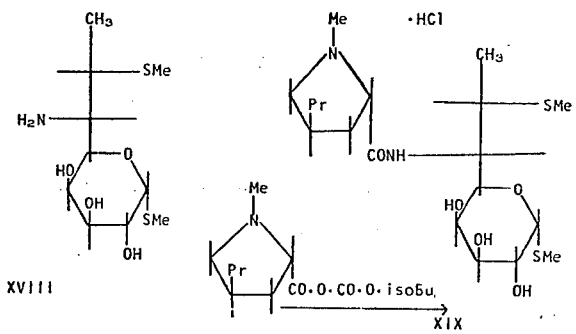

To a suspension of 4.15 gms. (2 mol. equivalents) transpropylhygric acid hydrochloride in 150 ccs. anhydrous acetonitrile is added 4.44 gms. (4.4 mol. equivs.) triethylamine. After the solid dissolves, the solution is cooled to −5° C. in an ice-methanol bath, causing the separation of triethylammonium chloride. To this solution is added 2.73 gms. (2 mol. equivs.) of isobutyl chloroformate so that the temperature does not exceed −3° C., and the reaction mixture stirred at −3° to −5° C. for 20 minutes. Then 2.83 gms. (1 mol. equiv.) of methyl 7-deoxy-7(S)-methylthio-α-thiolincosaminide (B-1), in 20 ccs. methanol and 20 ccs. water is added to the mixed anhydride, the precipitate of triethylammonium chloride dissolving at once. After 2 hrs. TLC ($SiO_2$ gel, 1 MeOH:10 $CHCL_3$) shows the disappearance of aminosugar, and the generation of a new zone of higher Rf. Volatile solvent is removed on a rotating evaporator at 40°/7 mm., and the syrupy residue dissolved in water by the addition of dilute aqueous hydrochloric acid (N) till the resultant solution is at ca. pH 2. This acid solution is extracted twice with methylene chloride, and the organic extracts discarded. The aqueous solution is adjusted to pH 11 by the addition of aqueous sodium hydroxide (50%), the resulting milky reaction mixture extracted three times with methylene chloride, and the combined extracts dried over anhydrous sodium sulfate, the residual alkaline aqueous layer being discarded.

Removal of solvent from the methylene chloride extract on a rotating evaporator at 40° C/7 mm. gives a slightly yellow syrup which is chromatographed on silica (1200 gms., columun dimensions 5.8 × 90 cms., hold-up volume 2000 ccs.) in the system 1 methanol:15 chloroform. After a forerun of 1800 ccs. 50 cc. fractions are collected, and the elution of material followed by TLC on silica in the same system.

Fractions nos. 21-54, inclusive, are combined to yield, on removal of solvent, a colorless syrup which is converted to the hydrochloride by dissolving in water to which dilute aqueous hydrochloric acid (N) is added till the solution is at ca. pH 3. This solution is then shell-frozen and lyophilized yielding 7-deoxy-7(S)-(methylthio)-lincomycin hydrochloride (C-3) as a colorless solid having the following characteristics:

$[\alpha]_D$ +125° (c, 0.8840, $H_2O$)

Analysis:

Calcd. for $C_{19}H_{36}O_5N_2S_2 \cdot HCl$:

C, 48.23; H, 7.88; -acetoxycyclohexylthio)-5.92; S, 13.56; Cl, 7.50;

M. Wt. 473.10 (M. Wt. free base, 436.63).

Found: C, 48.84; H, 7.71; N, 5.90) S, 12.96; Cl, 7.25;

M. Wt. (Mass spec., M$^+$ of free base) 436.

Biological Activity: In vitro; about 8 times lincomycin, with improved Gram negative activity.

EXAMPLE 2

7-Deoxy-7(S)-(ethylthio)-lincomycin Hydrochloride

Part A-2: Methyl N-acetyl-2,3,4-tri-O-acetyl-7-deoxy-7(S)-(ethylthio)-α-thiolincosaminide Following the procedure of Part A-1, but substituting the methyl sulfide by ethyl sulfide and heating under reflux for 7 hours, there is obtained methyl N-acetyl-2,3,4-tri-0-acetyl-7-deoxy-7(S)-(ethylthio)-α-thiolincosaminide (A-2) having the following characteristics:

K = 1.85 (same solvent system)

m.p. 236°–237° C.

$[\alpha]_D$ +215° (c, 0.95, CHCl$_3$)

Analysis:

Calcd. for $C_{19}H_{31}O_8NS_2$:

C, 49.01; H, 6.71; N, 3.01; S, 13.77.

Found: C, 49.18; H, 6.47; N, 3.41; S, 13.17.

This compound is also obtained at a K value of 6.15 in the countercurrent distribution of Example 12.

Part B-2: Methyl 7-deoxy-7(S)-(ethylthio)-α-thiolincosaminide

Following the procedure of Part B-1 the above compound (A-2) is converted to methyl 7-deoxy-7(S)-(ethylthio)-α- thiolincosaminide (B-2). It crystallizes from methanol as colorless prisms having the following characteristics:

m.p. 192-4° C.

$[\alpha]_D$ +253° (c, 0.73, H$_2$O)

Analysis:

Calcd. for $C_{11}H_{23}O_4NS_2$:

C, 44.42; H, 7.79; N, 4.71; S, 21.56.

Found: C, 44.16; H, 7.78; N, 4.72; S, 21.78.

Part C-2: 7-Deoxy-7(S)-(ethylthio)-lincomycin hydrochloride

Following the procedure of Part C-1, the above compound (B-2) is converted to 7-deoxy-7(S)-(ethylthio)-lincomycin hydrochloride (C-2). It is obtained as a lyophilized colorless solid having the following properties:

$[\alpha]_D$ +111° (c, 0,83, H$_2$O)

Analysis:

Calcd. for $C_{20}H_{38}O_5N_2S_2 \cdot HCl$:

C, 49.31; H, 8.07; N, 5.75; Cl, 7.28; S, 13.17;

M. Wt. 450.65 for free base.

Found (Corrected for 9.23% H$_2$O):

C, 49.52; H, 7.99; N, 5.61; Cl, 7.55; S, 13.46;

M. Wt. (Mass spec., M$^+$ of free base) 450.

Biological activity: about 8 times lincomycin.

EXAMPLE 3

Alternative Process to Example 2

Following the procedure of Part A-1, substituting the ethyl sulfide by ethyl disulfide and heating in an oil bath at 110° for 20 hours, the same 7(S)-(ethylthio) compound is obtained but in higher yields.

EXAMPLE 4

7-Deoxy-7(S)-(propylthio)-lincomycin Hydrochloride

Part A-4: Methyl N-acetyl-2,3,4-tri-0-acetyl-7-deoxy-7(S)-(propylthio)-α-thiolincosaminide Following the procedure of Part A-1, substituting the methyl sulfide by methyl propyl sulfide, methyl N-acetyl-2,3,4-tri-0-acetyl-7-deoxy-7(S)-(propylthio)-α-thiolincosaminide (A-4) is obtained from ethyl acetate:Skellysolve B as colorless needles having the following characteristics:

m.p. 259°–61° C.

$[\alpha]_D$ +203° (c, 0.96, CHCL$_3$)

Analysis:

Calcd. for $C_{20}H_{33}O_8NS_2$:

C, 50.08; H, 6.93; N, 2.92; S, 13.37.

Found: C, 49.89; H, 6.96; N, 3.02; S, 13.41.

K = 3.10 (Same solvent system)

There is also obtained the corresponding 7(S)-methylthio)- compound (A-1) at a K value of 1.32, in the ratio of one part to three parts of the 7(S)-(propylthio)- compound (A-4).

Part B-4: Methyl 7-deoxy-7(S)-(propylthio)-α-thiolincosaminide

Following the procedure of Part B-1, the compound (A-4) is converted to methyl 7-deoxy-7(S)-(propylthio)-α-thiolincosaminide (B-4). It crystallizes from methanol as colorless platelets having the following characteristics:

m.p. 189°–190° C.

$[\alpha]_D$ +257° (c, 0.,71, pyridine)

Analysis:

Calcd. for $C_{12}H_{25}O_4NS_2$:

C, 46.27; H, 8.09; N, 4.50; S, 20.59.

Found: C, 46.30; H, 8.21; N, 4.38; S, 20.58.

Part C-4: 7-Deoxy-7(S)-(propylthio)-lincomycin hydrochloride

Following the procedure of Part C-1, the above compound (B-4) is converted to 7-deoxy-7(S)-(propylthio)-lincomycin hydrochloride (C-4) as a lyophilized colorless amorphous solid having the following characteristics:

$[\alpha]_D$ +112° (c, 0.83, H$_2$O)

Analysis:

Calcd. for $C_{21}H_{40}O_5N_2S_2 \cdot HCl$:

C, 50.33; H, 8.25; N, 5.59; Cl, 7.08; S, 12.80;

M. Wt. free base 464.68.

Found (Corrected for 5.33% H$_2$O): C, 50.12; H, 8.03; N, 5.74; Cl, 6.94; S, 12.57; M. Wt. (Mass spec., M$^+$ of free base) 464.

Biological Activity: about 8 times lincomycin.

EXAMPLE 5

Alternative for Example 4

Following the procedure of Part A-2, substituting the ethyl sulfide by propyl sulfide, there is obtained methyl N-acetyl-2,3,4-tri-O-acetyl-7-deoxy-7(S)-(propylthio)-α-thiolincosaminide (A14).

EXAMPLE 6

7-Deoxy-7(S)-(isopropylthio)-lincomycin Hydrochloride

Part A-6: Methyl N-acetyl-2,3,4-tri-O-acetyl-7-deoxy-7-(S)-(isopropylthio)-α-thiolincosaminide Following the procedure of Part A-2 substituting the ethyl sulfide by methyl isopropyl sulfide, there is obtained methyl N-acetyl-2,3,4-tri-O-acetyl-7-deoxy-7(S)-(isopropylthio)-α-thiolincosaminide from ethyl acetate (A-6). It crystallizes as colorless needles having the following characteristics:

K = 2.94 in the system 1 ethanol:1 water:1 ethyl acetate: 2 cyclohexane
m.p. 274.5° –275.5° C.
$[\alpha]_D$ +200° (c, 0.87, CHCl$_3$)
Analysis:
Calcd. for C$_{20}$H$_{33}$O$_8$NS$_2$:
C, 50.08; H, 6.93; N, 2.92; S, 13.37.
Found: C, 49.79; H, 6.95; N, 2.78; S, 13.60.
Also formed is the 7(S)-methylthio compound (K = 1.32) in the ratio of 1.5 methylthio to 1 isopropylthio.

Substituting the methyl isopropyl sulfide by isopropyl disulfide there is obtained exclusively methyl N-acetyl-2,3,4-tri-O-acetyl-7-deoxy-7(S)-(isopropylthio)-α-thiolincosaminide.

Part B-6: Methyl 7-deoxy-7(S)-(isopropylthio)-α-thiolincosaminide

Following the procedure of Part B-1, the above isopropylthio compound (A-6) is converted to methyl 7-deoxy-7(S)-(isopropylthio)-α-thiolincosaminide as colorless platelets from methanol having the following characteristics:
m.p. 220° –221° C.
$[\alpha]_D$ + 269° (c, 0.85, pyridine)
Analysis:
Calcd. for C$_{12}$H$_{25}$O$_4$NS$_2$:
C, 46.27; H, 8.09; N, 4.50; S, 20.59.
Found: C, 46.02; H, 8.10; N, 4.45; S, 20.73.

Part C-6: 7-Deoxy-7(S)-(isopropylthio)-lincomycin hydrochloride

Following the procedure of Example 1, Part C-1, there is obtained 7-deoxy-7(S)-(isopropylthio)-lincomycin hydrochloride having the following characteristics: $[\alpha]_D$ +109° (c, 0.97, H$_2$O)
Analysis:
Calcd. for C$_{21}$H$_{40}$O$_5$N$_2$S$_2$·HCl:
C, 50.33; H, 8.25; N, 5.59; Cl, 7.08; S, 12.80; M. Wt. free base 464.68.
Found (Corrected for 5.00% H$_2$O):
C, 50.74; H, 8.50; N, 5.36; Cl, 6.74; S, 12.67; M. Wt. (Mass spec., M$^+$ of free base) 464.

EXAMPLE 7

7(S)-(CycloHexylthio)-7-deoxylincomycin Hydrochloride

Part A-7: Methyl N-acetyl-2,3,4-tri-O-acetyl-7-deoxy-7(S)-(cyclohexylthio)-α-thiolincosaminide Following the procedure of Example 1, Part A-1, substituting the methyl sulfide by cyclohexyl methyl sulfide but heating in an oil bath at 115° for 24 hours, there is obtained methyl N-acetyl-2,3,4-tri-O-acetyl-7-deoxy-7(S)-(cyclohexylthio)-α-thiolincosaminide (K = 5.95 using the system 1 ethanol:1 water:1 ethyl acetate:5 cyclohexane) as colorless prisms from ethyl acetate having the following characteristics:
m.p. 248°–250° C. $[\alpha]_D$ +184° (c, 0.86, CHCl$_3$)
Analysis:
Calcd. for C$_{23}$H$_{37}$O$_8$NS$_2$:
C, 53.15; H, 7.18; N, 2.70; S, 12.34.
Found: C, 53.27; H, 7.28; N, 2.79; S, 11.92.
There is also obtained corresponding 7(S)-(methylthio)-compound (K = 0.57) and otherwise characterized as the compound of Part A-1 in a ratio of about 1 part to each 5 parts of the (7(S)-cyclohexylthio compound.

Part B-7: Methyl 7-deoxy-7(S)-(cyclohexylthio)-α-thiolincosaminide

Following the procedure of Example 1, Part B-1, there is obtained methyl 7-deoxy-7(S)-(cyclohexylthio)-α-thiolincosaminide as colorless needles from methanol having the following characteristics:
m.p. 222° –223° C.
$[\alpha]_D$ +235° (c, 0.62, pyridine)
Analysis:
Calcd. for :C$_{15}$H$_{29}$O$_4$NS$_2$:
C, 51.25; H, 8.32; N, 3.99; S, 18.24.
Found: C, 50.94; H, 8.46; N, 3.69; S, 18.47.

Part C-7: 7(S)-(CycloHexylthio)-7-deoxylincomycin hydrochloride

Following the procedure of Example 1, Part C-1, there is obtained 7(S)-(cyclohexylthio)-7-deoxylincomycin hydrochloride having the following characteristics:
$[\alpha]_D$ +95° (c, 0.54, H$_2$O)
Analysis:
Calcd. for C$_{24}$H$_{44}$O$_5$N$_2$S$_2$·HCl:
C, 53.26; H, 8.38; N, 5.18; S, 11.85; Cl, 6.55; M. Wt. free base 504.74.
Found (Corrected for 4.42% H$_2$O):
C, 53.50; H, 8.43; N, 5.16; S, 11.96; Cl, 6.33; M. Wt. (Mass spec., M$^+$ of free base) 504.

EXAMPLE 8

Methyl N-acetyl-2,3,4-tri-O-acetyl-7-deoxy-7(S)-(cyclopentylthio)-α-thiolincosaminide Following the procedure of Example 1, Part A-1, substituting the methyl sulfide by methyl cyclopentyl sulfide but heating in an oil bath at 100° C. for 16 hrs., there is obtained methyl N-acetyl-2,3,4-tri-O-acetyl-7-deoxy-7(S)-(cyclopentylthio)-α-thiolincosaminide (A-8) at a K value of 4.0 using 1 ethanol:1 water:1 ethyl acetate:3 cyclohexane. It is obtained as colorless needles from ethyl acetate having the following characteristics:
m.p. 265°–265.5°
$[\alpha]_D$ +187° (c, 0.99, chloroform)
Analysis:
Calcd. for C$_{22}$H$_{35}$O$_8$NS$_2$:
C, 52.25; H, 6.98; N, 2.77; S, 12.68.
Mol. Wt. 505.64.
Found: C, 52.07; H, 6,88; N, 2.68; S, 12.62. Mol. Wt. (Mass spec., M$^+$) 505.

When methyl cyclopentyl sulfide is substituted by cyclopentyl disulfide, the same compound is obtained.

EXAMPLE 9

7(S)-(Butylthio)-7-deoxylincomycin hydrochloride

Part A-9: Methyl N-acetyl-2,3,4-tri-O-acetyl-7(S)-(butylthio)-7-deoxty-α-thiolincosaminide Following the procedure of Example 3, substituting the ethyl disulfide by butyl disulfide, there is obtained methyl N-acetyl-2,3,4-tri-O-acetyl-7(S)-(butylthio)-7-deoxy-α-thiolincosaminide (K = 3.35, 1 ethanol:1 water:1 ethyl acetate:3 cyclohexane) as colorless needles from ethyl acetate having the following characteristics:
m.p. 234°–5° C.
$[\alpha]_D$ +197° (c, 0.51, CHCl$_3$)
Analysis:

Calcd. for $C_{21}H_{35}O_8NS_2$:
C, 51.09; H, 7.15; N, 2.84; S, 12.99.
Found: C, 51.05; H, 7.21; N, 2.63; S, 12.76.

Part B-9: Methyl 7(S)-(butylthio)-7-deoxy-α-thiolincosaminide

Following the procedure of Example 1, Part B-1, there is obtained methyl 7(S)-(butylthio)-7-deoxy-α-thiolincosaminide as colorless plates from methanol having the following properties:
m.p. 188°–190° C.
$[\alpha]_D$ +250° (c, 1.00, pyridine)
Analysis:
Calcd. for $C_{13}H_{27}O_4NS_2$:
C, 47.97; H, 8.36; N, 4.30; S, 19.70.
Found: C, 47.88; H, 8.33; N, 4.37; S, 19.69.

Part C-9: 7-Deoxy-7(S)-(butylthio)-lincomycin hydrochloride

Following the procedure of Example 1, Part C-b 1, there is obtained 7-deoxy-7(S)-(butylthio)-lincomycin hydrochloride having the following characteristics:
$[\alpha]_D$ +106° (c, 0.65, $H_2O$)
Analysis:
Calcd. for $C_{22}H_{44}O_5N_2S_d \cdot HCl$:
C, 51.29; H, 8.41; N, 5.44; S, 12.45; Cl, 6.88;
M. Wt. of free bases 478.70.
Found (Corrected for 3.82% water):
C, 51.05; H, 8.70; N, 5.13; S, 12.28; Cl, 6.69;
M. Wt. (Mass spec., M+ of free base) 478.

EXAMPLE 10

7-Deoxy-7(S)-(2-hydroxyethylthio)-lincomycin hydrochloride

Part A-10a: Methyl N-acetyl-2,3,4-tri-O-acetyl-7-deoxy-7(S)-(2-hydroxyethylthio)-60 -thiolincosaminide Following the procedure of Example 1, Part A-1, substituting the methyl sulfide by 2-hydroxyethyl methyl sulfide but heating on a steam bath at 100° for 5 hours, there is obtained methyl N-acetyl-2,3,4-tri-O-acetyl-7-deoxy-7(S)-(2-hydroxyethylthio)-α-thiolincosaminide (K = 0.97, 1 ethanol:1 water:1 ethyl acetate:0.5 cyclohexane) as colorless needles from ethyl acetate-Skellysolve B having the following properties:
m.p. 226°–228° C.
$[\alpha]_D$ +185° (c, 1.00, $CHCl_3$)
Analysis:
Calcd. for $C_{19}H_{31}O_9NS_2$:
C, 47.38; H, 6.49; N, 2.91; S, 13.32.
Found: C, 47.18; H, 6.79; N, 2.86; S, 12.73.

Part A-10b: Methyl N-acetyl-2,3,4-tri-O-acetyl-7-deoxy-7(S)-(2-acetoxyethylthio)-α-thiolincosaminide Following the procedure of Example 1, Part A-1, substituting the methyl sulfide by 2-acetoxyethyl methyl sulfide but heating on a steam bath at 100° for 5 hours, there is obtained methyl N-acetyl-2,3,4-tri-O-acetyl-7-deoxy-7(S)-(2-acetoxyethylthio)-α-thiolincosaminide (K = 0.53, 1 ethanol:1 water:1 ethyl acetate:3 cyclohexane) as colorless needles from ethyl acetate-Skellysolve B having the following properties:
m.p. 206°–7° C.
$[\alpha]_D$ +180° (c, 0.79, $CHCl_3$)
Analysis:
Calcd. for $C_{21}H_{33}O_{10}NS_2$:
C, 48.17; H, 6.35; N, 2.68; S, 12.25.
Found: C, 48.12; H, 6.37; N, 2.58; S, 11.95.

Part B-10: Methyl 7(S)-(2-hydroxyethylthio)-7-deoxy-α-thiolincosaminide

Following the procedure of Example 1, Part B-1, there is obtained from compound A-10a or A-10b, 7-deoxy-7(S)-(2-hydroxyethylthio)-α-thiolincosaminide as colorless platelets from acetonitrile-ethanol having the following properties:
m.p. 175° –6°C.
$[\alpha]_D$ +234° (c, 0.52, $H_2O$)
Analysis:
Calcd. for $C_{11}H_{23}O_5NS_2$:
C, 42.15; H, 7.40; N, 4.47; S, 20.46.
Found: C, 42.05; H, 7.55; N, 4.43; S, 20.36.

Part C-10: 7-Deoxy-7(S)-(2-hydroxyethylthio)-lincomycin hydrochloride

Following the procedure of Example 1, Part C-1, there is obtained 7-deoxy-7(S)-(2-hydroxyethylthio)-lincomycin hydrochloride as a colorless amorphous material by lyophilization from aqueous solution having the following characteristics:
$[\alpha]_D$ +114° (c, 0.91, $H_2O$)
Analysis:
Calcd. for $C_{20}H_{38}O_8N_2S_2 \cdot HCl$:
C, 47.74; H, 7.81; N, 5.57; Cl, 7.05; S, 12.75;
M. Wt. of free base 466.65.
Found (Corrected for 6.75% $H_2O$):
C, 48.05; H, 7.70; N, 5.10; Cl, 6.96; S, 12.50;
M. Wt. (Mass spec., M+ of free base) 466.

This compound is about 8 times as active as lincomycin and has greater Gram negative activity in vivo, and is less toxic, than 7-deoxy-7 (S)-chlorolincomycin hydrochloride.

EXAMPLE 11

7(S)-(tert.Butylthio)-7-deoxylincomycin hydrochloride

Part A-11: Methyl N-acetyl-2,3,4-tri-O-acetyl-7(S)-(tert.butylthio)-7-deoxy-α-thiolincosaminide Following the procedure of Example 1, Part A-1, substituting the methyl sulfide by ter.butyl 2-mercaptoethyl sulfide but heating in an oil bath at 100° C. for 16 hrs., there is obtained crude methyl N-acetyl--2,3,4-tri-O-acetyl-7(S)-(tert.butylthio)-7-deoxy-α-thiolincosaminide.

Countercurrent distribution in the system 1 ethanol:1 water:1 ethyl acetate:3 cyclohexane yields methyl N-acetyl-2,3,4-tri-O-acetyl-7(S)-(tert.butylthio)-7-deoxy-α-thiolincosaminide at a K value of 2.38. It is obtained as small colorless needles from ethyl acetate having the following characteristics:
m.p. 272° –3° C.
$[\alpha]_D$ +187 (c, 0.64, chloroform)
Analysis:
Calcd. for $C_{21}H_{35}O_8NS_2$:
C, 15.09; H, 7.15; N, 2.84; S, 12.99.
Mol. Wt. 493.63. Found: C, 51.19; H, 7.28; N, 2.95; S, 13.13.
Mol. Wt. (Mass spec., M+) 493.

The same compound is obtained but in lower yields when the methyl sulfide of Part A-1 is substituted by tert.butyl sulfide.

Part B-11: 7(S)-(tert.Butylthio)-7-deoxy-α-thiolincosaminide

Following the procedure of Part B-1, there is obtained methyl 7(S)-(tert.butylthio)-7-deoxy-α-thiolincosaminide. Part C-11; 7(S)-(tert.Butylthio)-7-deoxylincomycin hydrochloride Following the procedure of Part C-1, there is obtained 7(S)-(tert.butylthio)-7-deoxylincomycin hydrochloride as an amorphous solid obtained by lyophilizing an aqueous solution.

Part D-11: Methyl N-acetyl-2,3,4-tri-O-acetyl-7(S)-[2-(tert.butylthio)ethylthio]-7-deoxy-α-thiolincosaminide The above countercurrent distribution (Part A-11) yields also methyl N-acetyl-2,3,4-tri-O-acetyl-7(S)-[2-(tert.butylthio)ethylthio]-7-deoxy-α-thiolincosaminide at a K value of 7.95. It is obtained as colorless, irregular platelets from ethyl acetate-Skellysolve B having the following characteristics:

m.p. 164°–5° C.

$[\alpha]_D$ +164° (c, 0.58, chloroform)

Analysis:

Calcd. for $C_{23}H_{39}O_8NS_3$:

C, 49.88; H, 7.10; N, 2.53; S, 17.37.

Mol. Wt. 553.75.

Found: C, 49.76; H, 7.03; N, 2.63; S, 17.39. Mol. Wt. (Mass spec., M$^+$) 553.

The tert.butyl 2-mercaptoethyl sulfide is obtained from the reaction between sodium tert.butyl mercaptide and ethylene sulfide in ethanol solution.

Following the procedures of Parts B-1 and C-1 there are obtained methyl 7(S)-[2-(tert.butylthio)ethylthio]-7-deoxy-α-thiolincosaminide and 7(S)-[2-(tert.butylthio)-ethylthio]-7-deoxylincomycin hydrochloride.

EXAMPLE 12

Part A-12: Methyl N-acetyl-2,3,4-tri-0-acetyl-7-deoxy7(S)-(ethyldithio)-α-thiolincosaminide Following the procedure of Example 1 substituting the methyl sulfide by tert.butyl ethyl disulfide but heating in an oil bath at 100° C. for 16 hrs. there is obtained a crude product containing methyl N-acetyl-2,3,4-tri-0-acetyl-7-deoxy-7(S)-(ethyldithio)-α-thiolincosaminide. Countercurrent distribution of this crude material in the system 1 ethanol:1 water:1 ethyl acetate:3 cyclohexane yields methyl 4-acetyl-2,3,4-tri-0-acetyl-7-deoxy-7(S)-(ethyldithio)-α-thiolincosaminide (A-12) admixed with methyl 4-acetyl-2,3,4-tri-0-acetyl-7(S)-(tert.butylthio)-7-deoxy-α-thiolincosaminide (A-11) in the proportions of 30 to 70, respectively. The K value of this mixture is 2.57. The two products are separable by vapor-phase chromatography and are differentiated by the fact that the former (A-12) shows a UV absorption at 245 nm, $\epsilon$, 546 whereas the latter (A-11) shows no UV absorption. The former compound (A-12) shows a molecular ion at m/e 497 by mass spec. as against a calculated value of 497.65. The latter compound (A-11) is identical with that obtained in Part A-11. Part B-12:

A solution of 600 mg. of the mixture (A-11 and A-12) of Part A-12 in 60 ml. of benzene and 2.72 g. of trisdiethylaminophosphine is heated under gentle reflux for 10 hrs. The solvent is removed by distillation under reduced pressure and the resulting syrup chromatographed on silica using 1 ethyl acetate:1 Skellysolve B as the solvent system in order to separate excess reagent and coproduced trisdiethylaminophosphine sulfide from the product which appears at an Rf of 0.51–0.54. Countercurrent distribution of this product in 1 ethanol:1 water:1 ethyl acetate: 3 cyclohexane yields methyl N-acetyl-2,3,4-tri-0-acetyl-7-deoxy-7(S-)-ethylthio-α-thiolincosaminide (A-2) at a K value of 1.43 and tert.butyl analog (A-11) at a K value 2.57.

Following the procedures of Parts B-1 and C-1, there are obtained from the above 30-70 mixture, 1) a corresponding mixture of methyl 7-deoxy-7(S)-(ethyldithio)-α-thiolincosaminide and methyl 7(S)-(tert.butylthio)-7-deoxy-α-thiolincosaminde, and 2) a corresponding mixture of 7-deoxy-7(S)-(ethyldithio)-lincomycin hydrochloride and 7(S)-(tert.butylthio)-lincomycin hydrochloride.

EXAMPLE 13

7(S)-(tert.Butyldithio)-7-deoxylincomycin hydrochloride

Part A-13: Methyl N-acetyl-2,3,4-tri-0-acetyl-7(S)-(tert.butyldithio)-7-deoxy-α-thiolincosaminide Following the procedure of Example 3, substituting the ethyl disulfide by tert.butyl disulfide, there is obtained methyl N-acetyl-2,3,4-tri-0-acetyl-7(S)-(tert.butyldithio)-7-deoxy-α-thiolincosaminide as small colorless rods from ethyl acetate:Skellysolve B having the following characteristics:

m.p. 241°–2° C.

$[\alpha]_D$ +220° (c, 0.56, CHCl$_3$)

(K = 7.35, 1 water:1 ethanol:1 ethyl acetate:3 cyclohexane)

Analysis:

Calcd. for $C_{21}H_{35}O_8NS_3$:

C, 47.98; H, 6.71; N, 2.67; S, 18.30.

Found: C, 48.03; H, 6.65; N, 2.65; S, 18.65;

M. Wt. (Calcd.) : 525.70.

Found (Mass spec., M$^+$) : 525

This compound is also obtained at a K value of 1.43 in the countercurrent distribution in Example 12.

EXAMPLE 14

Alternate for Example 1

Following the procedure of Example 3, substituting the ethyl disulfide by methyl tertiary butyl sulfide, there is obtained methyl N-acetyl-2,3,4-tri-0-acetyl-7-deoxy-7(S)-(methylthio)-α-thiolincosaminide which is the same compound as obtained in Example 1, Part A-1. The advantage of this alternative process is that higher yields of the desired product are obtained.

EXAMPLE 15

Alternative for Example 1

Following the procedure of Example 3, substituting the ethyl disulfide by 1,2-bis(methylthio)-ethane, there is obtained methyl N-acetyl-2,3,4tri-0,-acetyl-7-deoxy-7(S)-(methylthio)-α-thiolincosaminide which is identical to the product obtained in Example 1, Part A-1. This process, also giving improved yields, quite unexpectedly does not produce any of the 7(S)-[2-(methylthio)ethylthio]-compound.

EXAMPLE 16

7-Deoxy-7(S)-[(2-methylthio)ethylthio]-lincomycin hydrochloride and Alternative to Example 1

Part A-16:

Following the procedure of Example 3, substituting the ethyl disulfide by 2-(methylthio)ethanethiol, there is obtained methyl N-acetyl-2,3,4-tri-0-acetyl-7-deoxy-7(S)-(methylthio)-α-thiolincosaminide, which is the same compound as obtained in Example 1, together with methyl N-acetyl-2,3,4-tri-0-acetyl-7-deoxy-7(S)-

[(2-methylthio)-ethylthio]-α-thiolincosaminide in the proportions of 80 parts of the former and 20 parts of the latter. Counter-current distribution in the system 1 ethanol:1 water:1 ethyl acetate:3cyclohexane yields the latter compound at a K value of 1.84. It is obtained as colorless needles from ethyl acetate-Skellysolve B having the following characteristics:

m.p. 236°–7° C.
$[\alpha]_D$ +183° (c, 0.93, chloroform)
Analysis:
Calcd. for $C_{20}H_{33}O_8NS_2$:
C, 46.94, H, 6.50; N, 2.74; S, 18.80;
Mol Wt. 511.67.
Found: C, 46.96; H, 6.92; N, 2.49; S, 18.38; Mol. Wt. (Mass spec., $M^+$) 511.

Part B-16: Methyl 7-deoxy-7(S)-[(2-methylthio)ethylthio]-α-thiolincosaminide

Following the procedure of Part B-1 using the above compound (A-16) as the starting compound, there is obtained methyl 7-deoxy-7(S)-[(2-methylthio)ethylthio]-α-thiolincosaminide.

Part C-16: 7-Deoxy-7(S)-[(2-methylthio)ethylthio]-lincomycin hydrochloride

Following the procedure of Part C-1 using the above compound (B-16) as starting compound, there is obtained 7-deoxy-7(S)-[(2-methylthio)ethylthio]lincomycin hydrochloride.

EXAMPLE 17

Alternative to EXAMPLE 1

Following the procedure of Example 3, substituting the ethyl disulfide by 4-(methylthio)butanethiol, there is obtained methyl N-acetyl-2,3,4-tri-0-acetyl-7-deoxy7(S)-methylthio-α-thiolincosaminide which is identical with the compound of Part A-1.

The 4-(methylthio)butanethiol is obtained by the mono-S-methylation of the 1,4-butanedithiol using one equivalent of sodium hydroxide and methyl iodide in ethyl alcohol.

EXAMPLE 18

Alternative to Example 3

Following the procedure of Example 3, substituting the ethyl disulfide by ethyl trisulfide but heating in an oil bath at 100° for 16 hrs., the same 7(S)-ethylthio compound is obtained in good yields.

EXAMPLE 19

7-Deoxy-7(S)-[(3-methylthio)propylthio]lincomycin hydrochloride

Part A-19: Methyl N-acetyl-2,3,4-0-acetyl-7-deoxy7(S)-[(3-methylthio)propylthio]-α-thiolincosaminide Following the procedure of Example 15, substituting the ethyl trisulfide by 1,3-bis(methylthio)-propane, there is obtained methyl N-acetyl-2,3,4-tri-0-acetyl-7-deoxy-7(S)-[(3-methylthio)propylthio]-α-thiolincosaminide.

By countercurrent distribution using the same solvent system as in Example 16, the above compound is obtained at a K value of 2.24. It crystallizes from ethyl acetate as colorless needles having the following characteristics:

m.p. 211°–12° C.
$[\alpha]_D$ +181° (c, 1.1, chloroform)
Analysis:
Calcd. for $C_{21}H_{35}O_8NS_3$:
C, 47.93; H, 6.71; N, 2.67; S, 18.30;
Mol. Wt. 525.70.
Found: C, 47.97; H, 6.78; N, 2.62; S, 17.73; Mol. Wt. (Mass spec., $M^+$) 525.

Following the procedures of Parts B-1 and C-1, using the above compound (A-19) as the starting compound, there are obtained methyl 7-deoxy-7(S)-[(3-methylthio)propylthio]-α-thiolincosaminide and 7-deoxy-7(S)-[(3-methylthio)propylthiol]lincomycin hydrochloride. This process does not produce the methylthio derivative. The product is exclusively the 3-(methylthio)propylthio compound.

EXAMPLE 20

Part A-20:

Following the procedure of Example 16 substituting the 2-(methylthio)ethanethiol by 2-(methylthio)ethanethiol acetate, there is obtained methyl N-acetyl-2,3,4-tri-0-acetyl-7(S)-(2-acetylthioethylthio)-7-deoxy-α-thiolincosaminide; countercurrent distribution using the same solvent system as in Example 16, yields this compound at a K value of 1.55. It is obtained as small colorless rods from ethyl acetate having the following characteristics:

m.p. 198–9° C.
$[\alpha]_D$ +168° (c, 1.0. chloroform)
Analysis:
Calcd. for $C_{21}H_{33}O_9NS_3$:
C, 46.73; H, 6.16; N, 2.60; S, 17.63;
Mol. Wt. 539.68.
Found: C, 46.84; H, 6.05; N, 2.56; S, 17.52; Mol. Wt. [(Mass spec., $M^+$) -HCHS]493.

Following the procedures of Parts B-1 and C-1, using the above compound (A-20) as the starting compound, there are obtained methyl 7-deoxy-7(S)-(2-mercaptoethylthio)-α-thiolincosaminide and 7-deoxy-7(S)-(2-mercaptoethylthio)-lincomycin hydrochloride.

EXAMPLE 21

Part A-21:

Following the procedure of Example 1, Part A-1, substituting the methyl sulfide by 2-methoxyethyl methyl sulfide and heating in an oil bath at 100° for 16 hours, there is obtained methyl N-acetyl-2,3,4-tri-0-acetyl-7-deoxy7(S)-(2-methoxyethylthio)-α-thiolincosaminide. Countercurrent distribution using 1 ethanol:1 water:1 ethyl acetate:2 cyclohexane as the solvent system gave this compound at a K value of 0.88. It is obtained as colorless rods from ethyl acetate having the following characteristics:

m.p. 225°–7° C. $[\alpha]_D$ +171° (c, 0.90, chloroform)
Analysis:
Calcd. for $C_{20}H_{33}O_9NS_2$:
C, 48.47: H, 6.71; N, 2.83; S, 12.94;
Mol. Wt. 495.60.
Found: C, 48.72; H, 6.82; N, 2.79; S, 12.77; Mol. Wt. (Mass spec., $M^+$) 495.

Part B-21: Methyl 7-deoxy-7(S)-(2-methoxyethylthio)-α-thiolincosaminide

Following the procedure of Part B-1, there is obtained methyl 7-deoxy-7(S)-(2-methoxyethylthio)-α-thiolincosaminide as colorless needles from acetonitrile having the following characteristics:

m.p. 169–170° C.
$[\alpha]_D$ +223° (c, 0.93, water)
Analysis:

Calcd. for $C_{12}H_{25}O_5NS_2$:
C, 44.01; H, 7.70; N, 4.28; S, 19.58;
Mol. Wt. 327.46.
Found: C, 44.31; H, 7.53; N, 4.20; S, 19.42; Mol. Wt. (Mass spec., M+) 327.

Part C-21: 7-Deoxy-7(S)-(2-methoxyethylthio)lincomycin hydrochloride

Following the procedure of Part C-1, there is obtained 7-deoxy-7(S)-(2-methoxyethylthio)lincomycin hydrochloride as a lyophilized colorless amorphous solid having the following characteristics:
$[\alpha]_D$ +106° (c, 0.70, water)
Analysis:
Calcd. for $C_{21}H_{40}O_6N_2S_2 \cdot HCl$:
C, 48.77; H, 7.99; N, 5.42; Cl, 6.86; S, 12.40;
Mol. Wt. (of free base) 480.68.
Found (Corrected for 4.94% water):
C, 48.90; H, 7.95; N,5.51; Cl. 6.60; S, 12.23;
Mol. Wt. (Mass spec., M+ of free base) 480.

EXAMPLE 22

Part A-22: Methyl N-acetyl-2,3,4-tri-O-acetyl-7-deoxy-7(S)-(vinylthio)-α-thiolincosaminide Following the procedure of Part A-1, substituting the methyl sulfide by methyl vinyl sulfide and then heating at 100° for 16 hours, there is obtained methyl N-acetyl2,3,4-tri-0-acetyl-7-deoxy-7(S)-(vinylthio)-α-thiolincosaminide. Countercurrent distribution in the solvent system 1 ethanol:1 water:1 ethyl acetate:3 cyclohexane yields this compound at a K value of 1.57. It is obtained as colorless needles from ethyl acetate-Skellysolve B having the following characteristics:
m.p. 215.5-216° C.
$[\alpha]_D$ +168° (c. 0.79, chloroform)
Analysis:
Calcd. for $C_{19}H_{29}O_8NS_2$:
C, 49.23; H, 6.31; N, 3.02; S, 13.83;
Mol. Wt. 463.56.
Found: C, 49.06; H, 6.39; N, 3.13; S, 13.33; Mol. Wt. (Mass spec., M+) 463.

Following the procedures of Parts B-1 and C-1, using the above compound (A-22) as the starting compound, there are obtained methyl 7-deoxy-7(S)-(vinylthio)-α-thiolincosaminide and 7-deoxy-7(S)-(vinylthio)lincomycin hydrochloride.

EXAMPLE 23

Part A-23: Methyl N-acetyl-2,3,4-tri-0-acetyl-7-deoxy-7(S)-(allylthio)-α-thiolincosaminide and Methyl N-acetyl-2,3,4-tri-0-acetyl-7-deoxy-7(S)-(propenylthio)-α-thiolincosaminide Following the procedure of Part A-1, substituting the methyl sulfide by allyl sulfide and heating at 100° for 16 hours, there is obtained methyl N-acetyl-2,3,4-tri-0-acetyl7(S)-(allylthio)-7-deoxy-α-thiolincosaminide. There is also obtained methyl N-acetyl-2,3,4-tri-0-acetyl-7-deoxy7(S)-(propenylthio)-α-thiolincosaminide. Countercurrent distribution using the solvent system 1 ethanol:1 water:1 ethyl acetate:2 cyclohexane yields the allyl compound at a K value of 1.76 and the propenyl compound at a K value of 3.30. The allyl compound crystallized from ethyl acetateSkellysolve B as colorless needles having the following characteristics:
m.p. 235°-7° C.
$[\alpha]_D$ +194° (c, 0.63, chloroform)
Analysis:

Calcd. for $C_{20}H_{31}O_8NS_2$:
C, 50.29; H, 6.54; N, 2.93; S, 13.43;
Mol. Wt. 477.59.
Found: C, 50.10; H, 6.67; N, 2.79; S, 13.00; Mol. Wt. (Mass spec., M+) 477.

The propenyl compound is obtained as colorless needles from ethyl acetate-Skellysolve B having the following characteristics:
m.p. 273-5° C.
$[\alpha]_D$ +157° (c, 1.05, chloroform)
Analysis:
Calcd. for $C_{20}H_{31}O_8NS_2$: same as above
Found: C, 50.43; H, 6.45; N, 2.96; S, 13.37; Mol. Wt. (Mass spec., M+) 477.

Following the procedure of Parts B-1 and C-1, using the above compounds (A-23 allyl and A-23 propenyl) as the starting compounds, there are obtained methyl 7(S)-(allylthio)-7-deoxy-α-thiolincosaminide, methyl 7-deoxy-7(S)-(propenylthio)-α-thiolincosaminide, 7(-S)-(allylthio)-7-deoxylincomycin hydrochloride, and 7-deoxy-7(S)-(propenylthio)-lincomycin hydrochloride.

EXAMPLE 24

Part A-24: Methyl N-acetyl-2,3,,4-tri-O-acetyl-7(S)-(allyldithio)-7-deoxy-α-thiolincosaminide The procedure of Part A-1, substituting the methyl sulfide by allyl disulfide and heating at 100° C. for 16 hours is followed and the product chromatographed over silica gel using 1 ethyl acetate:1 Skellysolve B as the solvent system to remove excess reagent (of low polarity) followed by straight ethyl acetate to remove the more polar desired products. Countercurrent distribution of the latter using 1 ethanol:1 eater:1 ethyl acetate:3 cyclohexane as the solvent system yields methyl N-acetyl-2,3,4-tri-0-acetyl-7(S)-(allyldithio)-α-thiolincosaminide (A24) at a K value of 5.66. It crystallizes from ethyl acetate as stout, colorless prisms having the following characteristics:
m.p. 211°-3° C.
$[\alpha]_D$ +251° (c, 1.00, chloroform)
Analysis:
Calcd. for $C_{20}H_{31}O_8NS_3$:
C, 47.13; H, 6.13; N, 2.75; S, 18.88;
Mol. Wt. 509.66.
Found: C, 47.03; H, 6.16; N, 2.56; S, 18.68; Mol. Wt. (Mass spec., M+) 509.

The allylthio analog (A-21 allyl) is also obtained at a K value of 2.03.

Following the procedures of parts B-1 and C-1 there are obtained methyl 7(S)-(allyldithio)-7-deoxy-α-thiolincosaminide and 7(S)-(allyldithio)-7-deoxylincomycin hydrochloride.

EXAMPLE 25

Part A-25: Methyl N-acetyl-2,3,4-tri-0-acetyl-7-deoxy-7(S)-(2,3-dihydroxypropylthio)-α-thiolincosaminide Following the procedure of Part A- 1, substituting the methyl sulfide by 2,3-dihydroxypropyl methyl sulfide, there is obtained methyl N-acetyl-2,3,4-tri-O-acetyl-7-deoxy-7(S)-(2,3-dihydroxypropylthio)-α-thiolincosaminide. Countercurrent distribution using 1 ethanol:1 water;1.5 ethyl acetate:0.5 cyclohexane yielded this compound at a K value of 0.91. It is obtained as colorless platelets from ethyl acetate having the following characteristics:

m.p. 255-7° C.

[α]$_D$ +164° (c, .67, chloroform)

Analysis:

Calcd. for $C_{20}H_{33}O_{10}NS_2$:

C, 46.95; H, 6.50; N, 2.74; S, 12.54;

Mol. Wt. 511.60.

Found: C, 46.64; H, 6.67; N, 2.73: S, 12.59; Mol. Wt. (Mass spec., M$^+$) 511.

Following the procedure of Parts B-1 and C-1, using the above compound (A-25) as the starting compound, there are obtained methyl 7-deoxy-7(S)-(2,3-dihydroxypropylthio)-α-thiolincosaminide and 7-deoxy-7(S)-(2,3-dihydroxypropylthio)-lincomycin hydrochloride.

The starting 2,3-dihydroxypropyl methyl sulfide is obtained by reacting 1-chloro-2,3-dihydroxypropane with methanolic sodium methyl mercaptide.

EXAMPLE 26

7-Deoxy-7(S)-(phenylthio)lincomycin hydrochloride

Part A-26a: Methyl N-acetyl-2,3,4-tri-O-acetyl-7-deoxy-7(S)-(phenylthio)-α-thiolincosaminide Following the procedure of Part A-1, substituting the methyl sulfide by methyl phenyl sulfide, methyl N-acetyl-2,3,4-tri-O-acetyl-7(S)-(phenylthio)-α-thiolincosaminide is obtained as fine colorless needles from ethyl acetate having the following characteristics:

m.p. 275°–276° (K = 3.17, 1 ethanol:1 water;1 ethyl acetate:3 cyclohexane)

[α]$_D$ +164° (c, 0.53, ChCl$_3$)

Analysis:

Calcd. for $C_{23}H_{31}O_8NS_2$:

C, 53.73; H, 6.08; N, 2.73; S, 12.49.

Found: C, 53.87; H, 6.07; N, 2.48; S, 12.51.

Part A-26b: Alternate process

Following the procedure of Example 13, substituting the methyl phenyl sulfide by benzyl phenyl sulfide the same compounds are obtained. This process has the advantage of giving higher yields of the product.

Part B-26: Methyl 7-deoxy-7(S)-(phenylthio)-α-thiolincosaminide

Following the procedure of Part B-1, there is obtained methyl 7-deoxy-7(S)-(phenylthio)-α-thiolincosaminide as colorless flat needles from methanol having the following characteristics:

m.p. 193°–4° C.

[α]$_D$ +201° (c, 0.88, pyridine)

Analysis:

Calcd. for $C_{15}H_{23}O_4NS_2$:

C, 52.15; H, 6.71; N, 4.06; S, 18.56.

Found: C, 52.50; H, 6.78; N, 4.24; S, 18.33.

Part C-26: 7-Deoxy-7(S)-(phenylthio)-lincomycin hydrochloride

Following the procedure of Part C-1, there is obtained 7-deoxy-7(S)-(phenylthio)-lincomycin hydrochloride as a colorless amorphous solid having the following characteristics:

[α]$_D$ +81 (c, 0.63, H$_2$O)

Analysis:

Calcd. for $C_{24}H_{38}O_5N_2S_2·HCl$:

C, 53.86; H, 7.35; N, 5.24; S, 11.98; Cl, 6.63;

M. Wt. of free base 498.69.

Found (Corrected for 4.64% H$_2$O):

C, 54.08; H, 7.71; N, 5.55; S, 11.86; Cl, 6.49;

M. Wt. (Mass spec, M$^+$ of free base) 498.

EXAMPLE 27

7(S)-(Benzylthio)-7-deoxylincomycin hydrochloride

Part A-27: Methyl N-acetyl-2,3,4-tri-O-acetyl-7(S)-(benzylthio)-7-deoxy-α-thiolincosaminide Following the procedure of Example 18, substituting the 2-(methylthio)ethanethiol by benzyl sulfide, there is obtained methyl N-acetyl-2,3,4-tri-O-acetyl-7(S)-(benzylthio)-7-deoxy-α-thiolincosaminide.

Countercurrent distribution using as the solvent system 1 ethanol:1 water:0.5 ethyl acetate:3 cyclohexane yields this compound at a K value of 1.38. It is obtained as flattened prisms from ethyl acetate -Skellysolve B having the following characteristics:

m.p. 216°–18° C.

[α]$_D$ +161° (c, 1.07, chloroform)

Analysis:

Calcd. for $C_{24}H_{33}O_8NS_2$:

C, 54.63; H, 6.30; N, 2.66; S, 12.15.

Found: C, 55.02; H, 6.44; N, 2.94; S, 12.19.

Mol. Wt. Calcd. : 527.64.

Mol. Wt. Found (Mass spec., M$^+$) : 527

Part B-27:

Following the procedure of Part B-1, using the above compound (A-27) as the starting compound there is obtained methyl 7(S)-(benzylthio)-7-deoxy-α-thiolincosaminide as colorless plates from methanol having the following characteristics:

m.p. 215°–6° C.

[α]$_D$ +219° (c, 0.97, pyridine)

Analysis:

Calcd. for $C_{16}H_{25}O_4NS_2$:

C, 53.45; H, 7.01; N, 3.90; S, 17.84;

Mol. Wt. 359.50.

Found: C, 53.37; H, 7.07; N, 4.12; S, 18.07; Mol. Wt. (Mass spec., M$^+$) 359.

Part C-27:

Following the procedure of Part C-1, using the above compound (B-27) as the starting compound there is obtained 7(S)-(benzylthio)-7-deoxylincomycin hydrochloride as a colorless amorphous solid having the following characteristics:

[α]$_D$ +96.5° (c, 0.80, water)

Analysis:

Calcd. for $C_{25}H_{40}O_5N_2S_2·HCl$:

C, 54.67; H, 7.53; N, 5.10; Cl, 6.46 S, 11.68;

Mol. Wt. (free base): 512.72.

Found (Corrected for 2.74% water):

C, 54.89; H, 7.72; N, 4.83; Cl, 6.28; S, 11.86;

Mol. Wt. (Mass spec., M$^+$) 512.

EXAMPLE 28

1'-Demethyl-1'-(2-hydroxyethyl)-4'-depropyl-4'-cis-trans-pentyl-7-deoxy-7(S)-(methylthio)lincomycin hydrochloride (Methyl 6,7,8-trideoxy)-7-(methylthio)-6-cistrans-1-(2-hydroxyethyl)-4-pentyl-L-2-pyrrolidinecarboxamido)-1-thio-L-threo-α-D-galactooctopyranoiside hydrochloride)

Part A-28: 1'-Demethyl-1'-carbobenzoxy-4'-depropyl-4'-cistrans-pentyl-7-deoxy-7(S)-(methylthio)lincomycin hydrochloride Following the procedure of Part C-1 substituting the trans-propyl hygric acid by cis- trans-1-carbobenzoxy-4-pentyl-L-2-pyrrolidinecarboxylic acid using 2.2 mol. equivs. of triethylamine, there is obtained 1'-demethyl- 1-carbobenzoxy-4'-depropyl-4'-cis- trans-pentyl-7-deoxy-7(S)-(methylthio)-lincomycin hydrochloride.

It separates from ethyl acetate as fine needles melting at 158°–9° C. which are further characterized as follows:

$[\alpha]_D$ +118° (c, 0.84, chloroform)
Analysis:
Calcd. for $C_{28}H_{44}O_7N_2S_2$:
C, 57.51; H, 7.58; N, 4.79; S, 10.97;
Mol. Wt. 584.78.
Found: C, 57.47; H, 7.51; N, 4.73; S, 11.19; Mol. Wt. (Mass spec., M+) 584.

Part B-28: 1'-Demethyl-b 4'-depropyl-4'-cis- trans-pentyl-7-deoxy-7(S)-(methylthio)-lincomycin hydrochloride A solution of the above carbobenzoxy compound (A-28) in ethanol is hydrogenated in the presence of 10% palladium-on-carbon catalyst at a pressure of 50 lbs. per square inch hydrogen. The spent catalyst is removed by filtration and the solvent evaporated to dryness. Residue is taken up in acetone and a stoichiometric amount of aqueous 6N-hydrochloric acid is added. On the addition of ether, 1'-demethyl-4'depropyl-4'-cis- trans-pentyl-7-deoxy-7(S)-(methylthio)-lincomycin hydrochloride (B-28) crystallizes as minute colorless needles melting at 183°–4° C. (dec.) having the following chracteristics:

$[\alpha]_D$ +139° (c, 0.36, pyridine)
Analysis:
Calcd. for $C_{20}H_{38}O_5N_2S_2 \cdot HCl$:
C, 49.31; H, 8.07; N, 5.75; Cl, 7.28; S, 13.17;
Mol. Wt. (free base) 450.65.
Found (Corrected for 4.31% water):
C, 48.96; H, 8.15; N, 5.78; Cl, 7.34; S, 12.91;
Mol. Wt. 450.

Part C-28: 1'-Demethyl-1'-(2-hydroxyethyl)-4'-depropyl-4'-cis- trans-pentyl-7-deoxy-7(S)-(methylthio)lincomycin hydrochloride The N-demethyl hydrochloride named above (B-28) is dissolved in ethyl alcohol, the solution cooled to 0° C., an excess of ethylene oxide added, the container sealed and heated for 2 hours at 100°C. Removal of the volatile material gives a pale yellow syrupy residue which is dissolved in a mixture of chloroform and water and the pH adjusted to 10 with 50% aqueous sodium hydroxide. The organic layer is removed and dried over anhydrous sodium sulfate. The chloroform is removed and the residue chromatographed on silica gel using 1 methanol:10 chloroform as the solvent system. Fractions corresponding to Rf 0.31 are pooled, and evaporated to dryness. The residue is slurried with water and normal hydrochloric acid added to pH 4 at which time all the solid is dissolved. The desired product is recovered as an amorphous solid by lyophilization. It has the following characteristics:

$[\alpha]_D$ +88° (c, 0.82, water)
Analysis:
Calcd. for $C_{22}H_{42}O_6N_2S_2 \cdot HCl$:
C, 49.74; H, 8.16; N, 5.28; Cl, 6.68; S, 12.07;
Mol. Wt. (free base) 494.70.
Found (Corrected for 4.23% water):
C, 49.76; H, 7.99; N, 4.95; Cl, 6.76; S, 12.31;
Mol. Wt. (Mass spec., M+ of free base) 494.

EXAMPLE 29

Part A-29: Methyl N-acetyl-2,3,4-tri-O-acetyl-7-deoxy-7(S)-(2-hydroxyphenylthio)-α-thiolincosaminide Following the procedure of Part A-18, substituting the ethyl trisulfide by allyl 2-hydroxyphenyl sulfide, there is obtained methyl N-acetyl-2,3,4-tri-O-acetyl-7-deoxy-7(S)-(2-hydroxyphenylthio)-α-thiolincosaminide. Countercurrent distribution in the system 1 ethanol:1 water:1 ethyl acetate:2 cyclohexane yields this compound at a K value of 1.54. It is isolated as colorless rods from ethyl acetate having the following characteristics:

m.p. 240°–1° C.
$[\alpha]_D$ +154° (c, 0.83, chloroform)
Analysis:
Calcd. for $C_{23}H_{31}O_9NS_2$:
C, 52.16; H, 5.90; N, 2.65; S, 12.11;
Mol. Wt. 529.62.
Found: C, 52.23; H, 5.92; N, 2.72; S, 11.99; Mol. Wt. (Mass spec., M+) 529.

Following the procedures of Parts B-1 and C-1, there are obtained methyl 7-deoxy-7(S)-(2-hydroxyphenylthio)-α-thiolincosaminide and 7-deoxy-7(S)-(2-hydroxyphenylthio)-lincomycin hydrochloride.

EXAMPLE 30

Methyl N-acetyl-2,3,4-tri-O-acetyl-7-deoxy-7(S)-(2-hydroxy-2-methylethylthio)-α-thiolincosaminide Following the procedure of Part A-1, substituting the methyl sulfide by 2-hydroxy-2-methylethyl methyl sulfide but heating in an oil bath at 100° C. for 24 hrs. there is obtained methyl N-acetyl-2,3,4-tri-O-acetyl-7-deoxy-7(S)-(2-hydroxy-2-methylethylthio)-α-thiolincosaminide (K = 1.0 in 1 ethanol:1 water:1 ethyl acetate:0.75 cyclohexane) as colorless prisms from ethyl acetate having the following properties:

m.p. 246°–251° C.
$[\alpha]_D$ +171° (c, 0.88, CHCl$_3$)
Analysis:
Calcd. for $C_{20}H_{33}O_9NS_2$:
C, 48.47; H, 6.71; N, 2.83; S, 12.94;
Mol. Wt. 495.60.
Found: C, 48.51; H, 6.71; N, 2.77; S, 12.72; Mol. Wt. (Mass spec., M+) 495.

The starting 2-hydroxy-2-methylethyl methyl sulfide is prepared by heating 2-hydroxy-2-methylethyl bromide or 2-hydroxy-1-methylethyl bromide or a mixture of the two with sodium methyl mercaptide in ethanol.

By starting with 2-acetoxy-2-methylethyl methyl sulfide in place of the 2-hydroxy-2-methylethyl methyl sulfide, methyl 7(S)-(2-acetoxy-2-methylethylthio)-N-acetyl-2,3,4-tri-O-acetyl-7-deoxy-α-thiolincosaminide, m.p. 199°–200°0 C., is obtained.

Following the procedures of Parts B-1 and C-1 methyl N-acetyl-2,3,4-tri-O-acetyl-7-deoxy-7(S)-(2-hydroxy-2-methylethylthio)-α-thiolincosaminide and methyl 7(S)-(2-acetoxy-2-methylethylthio)-N-acetyl-2,3,4-tri-O-acetyl-7-deoxy-α-thiolincosaminide are converted to methyl 7-deoxy-7(S)-(2-hydroxy-2-methylethylthio)-α-thiolincosaminide and 7-deoxy 7(-S)-(2-hydroxy-2-methylethylthio)-lincomycin.

EXAMPLE 31

7-Deoxy-7(S)-(3-hydroxypropylthio)-lincomycin hydrochloride

Part A-31: Methyl N-acetyl-2,3,4-tri-O-acetyl-7(S)-(3-acetoxypropylthio)-7-deoxy-α-thiolincosaminide Following the procedure of Part A-1, substituting the methyl sulfide by 3-acetoxypropyl methyl sulfide, there is obtained methyl N-acetyl-2,3,4-tri-O-acetyl-7(S)-(3-acetoxypropylthio)-7-deoxy-α-thiolincosaminide (K = 1.0, 1 ethanol:1 water:1 ethyl acetate:2 cyclohexane) as colorless needles from ethyl acetate:Skellysolve B having the following characteristics:

m.p. 172.5–174°
$[\alpha]_D$ +178° (c, 0.94, CHCl$_3$)
Analysis:
Calcd. for $C_{22}H_{35}ONS_2$:
C, 49.15; H, 6.56; N, 2.61; S, 11.93.
Found: C, 49.31; H, 6.58; N, 2.68; S, 11.83.

Part B-31: Methyl 7-deoxy-7(S)-(3-hydroxypropylthio)-α-thiolincosaminide

Following the procedure of Part B-1, substituting the methyl N-acetyl-2,3,4-tri-O-acetyl-7(S)-(methylthio)-α-thiolincosaminide by methyl N-acetyl-2,3,4-tri-O-acetyl-7(S)-(3-acetoxypropylthio)-7-deoxy-α-thiolincosaminide, there is obtained methyl 7-deoxy-7(S)-(3-hydroxypropylthio)-α-thiolincosaminide as colorless needles from water having the following characteristics:

m.p. 194°–196°
$[\alpha]_D$ +234° (c, 0.79, pyridine)
Analysis:
Calcd. for $C_{12}H_{25}O_5NS_2$:
C, 44.01; H, 7.70; N, 4.28; S, 19.58.
Found: C, 43.93; H, 7.81; N, 4.45; S, 19.55.

Part C-31: 7-Deoxy-7(S)-(3-hydroxypropylthio)lincomycin hydrochloride

Following the procedure of Part C-1, substituting the methyl 7-deoxy-7(S)-(methylthio)-α-thiolincosaminide by methyl 7-deoxy-7(S)-(3-hydroxypropylthio)-α-thiolincosaminide, there is obtained 7-deoxy-7(S)-(3-hydroxypropylthio)lincomycin hydrochloride as an amorphous solid having the following characteristics:

$[\alpha]_D$ +110° (c, 0.82, H$_2$O)
Analysis:
Calcd. for $C_{21}H_{40}O_6N_2S_2$. HCl
C, 48.77; H, 7.99; N, 5.42; Cl, 6.86; S, 12.40;
Mol. Wt. of free base 480.68.
Found (Corrected for 2.86% water):
C, 49.11; H, 8.10; N, 5.88; S, 12.15; Cl, 6.82;
Mol. Wt. (Mass spec., M$^+$) 480.

EXAMPLE 32

7(S)-(4-Acetoxybutylthio)-7-deoxylincomycin hydrochloride

Part A-32: Methyl 7(S)-(4-acetoxybutylthio)-7-deoxy-α-thiolincosaminide

Following the procedure of Part A-1, substituting the methyl sulfide by 4-acetoxybutyl methyl sulfide but heating at 110° C. for 20 hours, there is obtained methyl N-acetyl-2,3,4-tri-O-acetyl-7(S)-(4-acetoxybutylthio)-7-deoxy-α-thiolincosaminide (K = 1.32, 1 ethanol:1 water:1 ethyl acetate:2 cyclohexane) as fine rosettes of needles from ethyl acetateSkellysolve B having the following characteristics:

m.p. 149°–150° c.
$[\alpha]_D$ +171° (c, 0.88, CHCl$_3$)
Analysis:
Calcd. for $C_{23}H_{37}O_{10}NS_2$:
C, 50.07; H, 6.76; N, 2.54; S, 11.62.
Found: C, 49.97; H, 6.86; N, 2.50; S, 11.35.

Part B-32: Methyl 7-deoxy-7(S)-(4-hydroxybutyl)-α-thiolincosaminide

Following the procedure of Part B-1, there is obtained methyl 7-deoxy-7(S)-(4-hydroxybutylthio)-α-thiolincosaminide as microcrystalline needles from methanol having the following characteristics:

m.p. 164°–5°
$[\alpha]_D$ +218° (c, 0.41, H$_2$O)
Analysis:
Calcd. for $C_{13}H_{27}O_5NS_2$:
C, 45.72; N, 7.97; N, 4.10; S, 18.78.
Found: C, 45.73; H, 8.13; N, 4.22; S, 18.33.

Part C-32: 7-Deoxy-7(S)-(4-hydroxybutylthio)-lincomycin hydrochloride

Following the procedure of Part C-1, there is obtained 7-deoxy-7(S)-(4-hydroxybutylthio)-lincomycin hydrochloride as an amorphous solid having the following characteristics:

$[\alpha]_D$ +105° (c, 0.96, H$_2$O)
Analysis:
Calcd. for $C_{22}H_{42}O_6N_2S_2$.HCl:
C, 49.74; H, 8.16; N, 5.28; Cl, 6.68; S, 12.07;
M. Wt. of free base 494.70.
Found (Corrected for 3.70% H$_2$O):
C, 49.58; H, 8.19; N, 5.23; Cl, 6.48; S, 12.10;
M. Wt. (Mass spec., M$^+$ of free base) 494.

EXAMPLE 33

Methyl N-acetyl-2,3,4-tri-O-acetyl-7(S)-(5-acetoxypentylthio)-7-deoxy-α-thiolincosaminide Following the procedure of Part A-1, substituting the methyl sulfide by 5-acetoxypentyl methyl sulfide and heating at 100° C. for 16 hrs., there is obtained methyl N-acetyl-2,3,4-tri-O-acetyl-7(S)-(5-acetoxypentylthio)-7-deoxy-α-thiolincosaminide having a K value of 1.94 in 1 ethanol:1 H$_2$O:1 ethyl acetate:2 cyclohexane and the following characteristics as recrystallized from ethyl acetate-Skellysolve B.

m.p. 158°–9° C. (needles)
$[\alpha]_D$ +169° (c, 0.60, CHCl$_3$)
Analysis:
Calcd. for $C_{24}H_{39}O_{10}NS_2$:
C, 50.95; N, 6.95; N, 2.48; S, 11.34.
Found: C, 50.88; H, 6.98; N, 2.41; S, 11.22.

Following the procedures of Parts B-1 and C-2, there are obtained methyl 7-deoxy-7(S)-(5-hydroxypentylthio)-α-thiolincosaminide and 7-deoxy-7(S)-(5-hydroxypentylthio)lincomycin hydrochloride.

EXAMPLE 34

Methyl N-acetyl-2,3,4-tri-O-acetyl-7(S)-(2-acetoxycyclohexylthio)-7-deoxy-α-thiolincosaminide Following the procedure of Part A-1, substituting the methyl sulfide, by 2-acetoxycyclohexyl methyl sulfide and heating at 100° C. for 16 hours, there is obtained methyl N-acetyl-2,3,4-tri-O-acetyl-7(S)-(2-acetoxycyclohexylthio)-7-deoxy-α-thiolincosaminide. Countercurrent distribution in the solvent system 1 ethanol:1 water:0.5 ethyl acetate:3 cyclohexane yielded this compound at a K value of 0.80. It is obtained as colorless needles from ethyl acetate having the following characteristics:

m.p. 205°–6° C.
$[\alpha]_D$ +153° (c, 0.64, CHCl$_3$)
Analysis:
Calcd. for $C_{25}H_{39}O_{10}NS_2$:
C, 51.97; H, 6.80; N, 2.43; S, 11.10;
Mol. Wt. 577.70.
Found: C, 51.82; H, 6.87; N, 2.29; S, 11.12;
Mol. Wt. (Mass spec., M$^+$) 577.

Following the procedure of Parts B-1 and C-1, there are obtained methyl 7-deoxy-7(S)-[(2-hydroxycyclohexyl)thio]-α-thiolincosaminide and 7-deoxy-7(S)-[(2-hydroxycyclohexyl)thio]lincomycin hydrochloride.

I claim:
1. A compound of the formula:

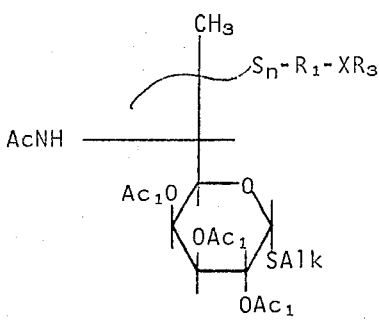

wherein $n$ is 1; Alk is alkyl of not more than 4 carbon atoms, or Ac$_1$OCH$_2$CH$_2$–; Ac$_1$ is selected from hydrogen and hydrocarbon carboxacyl containing not more than 18 carbon atoms or halo-, nitro-, hydroxy-, amino-, cyano-, thiocyano or alkoxy-substituted hydrocarbon carboxacyls of not more than 18 carbon atoms; Ac is selected from hydrogen, hydrocarbon carboxacyl as defined above, and an L-2-pyrrolidinecarboxacyl group selected from L-2 pyrrolidinecarboxacyl, N-methyl-L-2-pyrrolidinecarboxacyl, N-ethyl-L-2-pyrrolidinecarboxacyl, N-(2-hydroxyethyl)-L-2-pyrrolidinecarboxacyl and forms thereof substituted in the 4-position with a group selected from lower alkyl and lower alkylidene; provided that when Ac is hydrogen, Ac$_1$ is hydrogen and when Ac is hydrocarbon carboxacyl, Ac$_1$ is hydrocarbon carboxacyl; R$_1$ is a saturated aliphatic hydrocarbon radical of not more than 18 carbon atoms, an unsaturated aliphatic hydrocarbon radical of not more than 10 carbon atoms, a cycloaliphatic hydrocarbon radical of not more than 10 carbon atoms; an aromatic hydrocarbon radical of not more than 11 carbon atoms, or an oxacarbocyclic aromatic or thiacarbocyclic aromatic hydrocarbon radical of not more than 8 carbon atoms; XR$_3$ is hydrogen or a group wherein X is oxygen or sulfur and R$_3$ is hydrogen, hydrocarbon carboxacyl containing not more than 18 carbon atoms or halo-, nitro-, hydroxy-, amino-, cyano-, thiocyano-, or alkoxy-substituted hydrocarbon carboxacyls of not more than 18 carbon atoms, lower alkyl, lower alkenyl, lower cycloalkyl, lower cycloalkenyl, lower alkoxyalkyl, lower alkylthioalkyl, phenyl, benzyl, furyl, furfuryl, thienyl, or thenyl; and wherein R$_1$ and R$_3$, when X is oxygen and R$_3$ is alkyl, can be linked together to form an oxacycloalkyl of not more than 5 carbon atoms, having from 3 to 6 ring members in the ring, and the acid addition salts thereof with the proviso that when X is sulfur, R$_3$ is neither hydrogen, hydrocarbon carboxacyl containing not more than eighteen carbon atoms nor halo-, nitro-, hydroxy-, amino-, cyano-, thiocyano-, or alkoxy-substituted hydrocarbon carboxacyl of not more than 18 carbon atoms.

2. A compound according to claim 1 in which Ac and Ac$_1$ are acetyl and $n$ is 1.

3. A compound according to claim 2 in which Alk is methyl.

4. Methyl N-acetyl-2,3,4-tri-O-acetyl-7-deoxy-7(S)-(methylthio)-α-thiolincosaminide, a compound according to claim 1.

5. Methyl N-acetyl-2,3,4-tri-O-acetyl-7-deoxy-7(S)-(ethylthio)-α-thiolincosaminide, a compound according to claim 1.

6. Methyl N-acetyl-2,3,4-tri-O-acetyl-7-deoxy-7(S)-(propylthio)-α-thiolincosaminide, a compound according to claim 1.

7. Methyl N-acetyl-2,3,4-tri-O-acetyl-7-deoxy-7(S)-(isopropylthio)-α-thiolincosaminide, a compound according to claim 1.

8. Methyl N-acetyl-2,3,4-tri-O-acetyl-7-deoxy-7(S)-(cyclohexylthio)-α-thiolincosaminide, a compound according to claim 1.

9. Methyl N-acetyl-2,3,4-tri-O-acetyl-7-deoxy-7(S)-(cyclopentylthio)-α-thiolincosaminide, a compound according to claim 1.

10. Methyl N-acetyl-2,3,4-tri-O-acetyl-7(S)-(butylthio)-7-deoxy-α-thiolincosaminide, a compound according to claim 1.

11. Methyl N-acetyl-2,3,4-tri-O-acetyl-7-deoxy-7(S)-(2-hydroxyethylthio)-α-thiolincosaminide, a compound according to claim 1.

12. Methyl N-acetyl-2,3,4-tri-O-acetyl-7(S)-(tert-butylthio)-7-deoxy-α-thiolincosaminide, a compound according to claim 1.

13. Methyl N-acetyl-2,3,4-tri-O-acetyl-7-deoxy-7(S)-(methylthio)ethyl-α-thiolincosaminide, a compound according to claim 1.

14. Methyl N-acetyl-2,3,4-tri-O-acetyl-7-deoxy-7(S)-[2-(tert.butylthio)ethylthio]-7-deoxy-α-thiolincosaminide, a compound according to claim 1.

15. Methyl N-acetyl-2,3,4-tri-O-acetyl-7-deoxy-7(S)-[(3-methylthio)propylthio]-α-thiolincosaminide, a compound according to claim 1.

16. Methyl N-acetyl-2,3,4-tri-O-acetyl-7-deoxy-7(S)-(2-methylethylthio)-α-thiolincosaminide, a compound according to claim 1.

17. Methyl N-acetyl-2,3,4-tri-O-acetyl-7-deoxy-7(S)-(vinylthio)-α-thiolincosaminide, a compound according to claim 1.

18. Methyl N-acetyl-2,3,4-tri-O-acetyl-7-deoxy-7(S)-(allylthio)-α-thiolincosaminide, a compound according to claim 1.

19. Methyl N-acetyl-2,3,4-tri-O-acetyl-7-deoxy-7(S)-(propenylthio)-α-thiolincosaminide, a compound according to claim 1.

20. Methyl N-acetyl-2,3,4-tri-O-acetyl-7-deoxy-7(S)-(phenylthio)-α-thiolincosaminide, a compound according to claim 1.

21. Methyl N-acetyl-2,3,4-tri-O-acetyl-7(S)-(benzylthio)-7-deoxy-α-thiolincosaminide, a compound according to claim 1.

22. Methyl N-acetyl-2,3,4-tri-O-acetyl-7-deoxy-7(S)-(2-hydroxyphenylthio)-α-thiolincosaminide, a compound according to claim 1.

23. Methyl N-acetyl-2,3,4-tri-O-acetyl-7-deoxy-7(S)-(2-hydroxy-2-methylethylthio)-α-thiolincosaminide, a compound according to claim 1.

24. Methyl N-acetyl-2,3,4-tri-O-acetyl-7-deoxy-7(S)-(2-acetoxyethylthio)-α-thiolincosaminide, a compound according to claim 1.

25. Methyl N-acetyl-2,3,4-tri-O-acetyl-7(S)-(3-acetoxypropylthio)-7-deoxy-α-thiolincosaminide, a compound according to claim 1.

26. Methyl N-acetyl-2,3,4-tri-O-acetyl-7(S)-(4-acetoxybutylthio)-7-deoxy-α-thiolincosaminide, a compound according to claim 1.

27. A compound or an acid addition salt thereof according to claim 1 wherein Ac and Ac₁ are hydrogen, n is 1 and Alk is methyl, ethyl, or 2-hydroxyethyl.

28. A compound or an acid addition salt thereof according to claim 1 wherein Ac and Ac₁ are hydrogen, n is 1 and Alk is methyl.

29. Methyl 7-deoxy-7(S)-(methylthio)-α-thiolincosaminide, according to claim 1.

30. Methyl 7-deoxy-7(S)-(ethylthio)-α-thiolincosaminide, according to claim 1.

31. Methyl 7-deoxy-7(S)-(propylthio)-α-thiolincosaminide, according to claim 1.

32. Methyl 7-deoxy-7(S)-(isopropylthio)-α-thiolincosaminide, according to claim 1.

33. Methyl 7-deoxy-7(S)-(cyclohexylthio)-α-thiolincosaminide, according to claim 1.

34. Methyl 7(S)-(butylthio)-7-deoxy-α-thiolincosaminide, according to claim 1.

35. Methyl 7(S)-(2-hydroxyethylthio)-7-deoxy-α-thiolincosaminide, according to claim 1.

36. Methyl 7-deoxy-7(S)-(2-methoxyethylthio)-α-thiolincosaminide, according to claim 1.

37. Methyl 7-deoxy-7(S)-(phenylthio)-α-thiolincosaminide, according to claim 1.

38. Methyl 7(S)-(benzylthio)-7-deoxy-α-thiolincosaminide, according to claim 1.

39. Methyl 7-deoxy-7(S)-(2-hydroxyphenylthio)-α-thiolincosaminide, according to claim 1.

40. Methyl 7-deoxy-7(S)-(3-hydroxypropylthio)-α-thiolincosaminide, a compound according to claim 1.

41. Methyl 7-deoxy-7(S)-(4-hyroxybutyl)-α-thiolincosaminide, a compound according to claim 1.

42. A compound or an acid addition salt thereof according to claim 1 wherein Ac₁ is hydrogen and Ac is the acyl of an L-2-pyrrolidinecarboxylic acid and Alk is methyl, ethyl, or 2-hydroxyethyl.

43. A compound or an acid addition salt thereof according to claim 42 wherein the L-2-pyrrolidinecarboxylic acid is substituted in the 4-position by a lower alkyl or a lower alkylidene group.

44. A compound or an acid addition salt thereof according to claim 43 in which the 1-position is substituted by a methyl, ethyl or 2-hydroxyethyl group and the 4-position by trans-propyl.

45. A compound or an acid addition salt thereof according to claim 1 wherein Ac₁ is hydrogen and Ac is the acyl of a trans-1-methyl-4-propyl-L-2-pyrrolidinecarboxylic acid, Alk is methyl.

46. 7-Deoxy-7(S)-(methylthio)lincomycin hydrochloride [Methyl 6,7,8-trideoxy-7-(methylthio)-6-trans-(1-methyl-4-propyl-L-2-pyrrolidenecarboxamido)]-1-thio-L-threo-α-D-galacto-octopyranoside hydrochloride, according to claim 1.

47. 7-Deoxy-7(S)-(ethylthio)-lincomycin hydrochloride, according to claim 1.

48. 7-Deoxy-7(S)-(propylthio)-lincomycin hydrochloride, according to claim 1.

49. 7-Deoxy-7(S)-(isopropylthio)-lincomycin hydrochloride, according to claim 1.

50. 7(S)-(cyclohexylthio)-7-deoxylincomycin hydrochloride, according to claim 1.

51. 7-Deoxy-7(S)-(butylthio)-lincomycin hydrochloride, according to claim 1.

52. Methyl N-acetyl-2,3,4-tri-O-acetyl-7-deoxy-7(S)-(2-methoxyethylthio)-lincomycin hydrochloride, according to claim 1.

53. 7-Deoxy-7(S)-(2-hydroxyethylthio)-lincomycin hydrochloride, according to claim 1.

54. 7-Deoxy-7(S)-(phenylthio)-lincomycin hydrochloride, according to claim 1.

55. 7(S)-(benzylthio)-7-deoxylincomycin hydrochloride, according to claim 1.

56. 7-Deoxy-7(S)-(2-hydoxyphenylthio)-lincomycin hydrochloride, according to claim 1.

57. 7-Deoxy-7(S)-(2-hyroxycyclohexylthio)lincomycin hydrochloride, according to claim 1.

58. 1'-Demethyl-1'-carbobenzoxy-4'-depropyl-4'-cis- transpentyl-7-deoxy-7(S)-(methylthio)lincomycin.

59. 1'-Demethyl-4'-depropyl-4'-cis- trans-pentyl-7-deoxy-7(S)-(methylthio)lincomycin hydrochloride.

60. 1'-Demethyl-1'-(2-hydroxyethyl)-4'-depropyl-4'-cis-trans-pentyl-7-deoxy-7(S)-(methylthio)lincomycin hydrochloride.

61. Methyl N-acetyl-2,3,4-tri-O-acetyl-7(S)-(2-acetoxyethylthio)-7-deoxy-α-lincosaminide according to claim 1.

62. Methyl N-acetyl-2,3,4-tri-O-acetyl-7(S)-(5-acetoxypentylthio)-7-deoxy-α-thiolincosaminde according to claim 1.

63. Methyl N-acetyl-2,3,4-tri-O-acetyl-7(S)-(2-acetoxy-cyclohexylthio)-7-deoxy-α-thiolincosaminide according to claim 1.

64. A compound in accordance with claim 1 wherein R₁ is selected from the group consisting of saturated aliphatic hydrocarbon radical of not more than eighteen carbon atoms, unsaturated aliphatic hydrocarbon radical of not more than eighteen carbon atoms, cycloaliphatic hydrocarbon radical of not more than ten carbon atoms, phenylene and benzylene; XR₃ is hydrogen or a group wherein X is oxygen or sulfur and when X is oxygen, R₃ is selected from the group consisting of hydrogen, lower alkyl, and hydrocarbon carboxacyl containing not more than eighteen carbon atoms, and when X is sulfur, R₃ is selected from the group consisting of lower alkyl and lower alkoxyalkyl.

65. A compound in accordance with claim 64 wherein when X is sulfur, R₃ is lower alkyl.

* * * * *